United States Patent
Friedman et al.

(10) Patent No.: US 11,935,120 B2
(45) Date of Patent: Mar. 19, 2024

(54) HARDWARE-BASED TRANSACTION EXCHANGE

(71) Applicant: Liquid-Markets GmbH, Baar (CH)

(72) Inventors: Seth Gregory Friedman, Tokyo (JP); Alexis Nicolas Jean Gryta, Tokyo (JP); Thierry Gibralta, Tokyo (JP)

(73) Assignee: Liquid-Markets GmbH, Baar (CH)

( * ) Notice: Subject to any disclaimer, the term of this patent is extended or adjusted under 35 U.S.C. 154(b) by 0 days.

(21) Appl. No.: 17/928,844

(22) PCT Filed: Jun. 8, 2021

(86) PCT No.: PCT/US2021/036299
§ 371 (c)(1),
(2) Date: Nov. 30, 2022

(87) PCT Pub. No.: WO2021/252423
PCT Pub. Date: Dec. 16, 2021

(65) Prior Publication Data
US 2023/0196458 A1   Jun. 22, 2023

Related U.S. Application Data

(60) Provisional application No. 63/035,993, filed on Jun. 8, 2020.

(51) Int. Cl.
*G06Q 40/04* (2012.01)
(52) U.S. Cl.
CPC .................... *G06Q 40/04* (2013.01)
(58) Field of Classification Search
CPC ..................................................... G06Q 40/04
See application file for complete search history.

(56) References Cited

U.S. PATENT DOCUMENTS 5,926,473 A   7/1999   Gridley
6,185,634 B1   2/2001   Wilcox
(Continued)

FOREIGN PATENT DOCUMENTS

EP   3161649 B1   7/2019
EP   2092419 B1   1/2020
(Continued)

OTHER PUBLICATIONS

"Data Link Layer", www.wikipedia.org (Jul. 15, 2015).
(Continued)

*Primary Examiner* — Jessica Lemieux
(74) *Attorney, Agent, or Firm* — McDonnell Boehnen Hulbert & Berghoff LLP

(57) ABSTRACT

A system may include a field programmable gate array (FPGA) based gateway comprising: a network interface configured to receive data packets containing proposed transactions, and validation logic circuitry configured to validate one or more headers or application-layer of the data packets in accordance with filter rules. The system may also include an FPGA based router comprising: a network interface configured to receive the data packets from the gateway, and parsing and lookup circuitry configured to compare the header field or application-layer field values in the data packets to those in a forwarding table. The system may also include an FPGA based matching engine comprising: a network interface configured to receive the data packets from the router, transaction validation circuitry configured to validate the proposed transactions based on information from state memory and policies, and matching algorithm circuitry configured to match pair of proposed transactions according to pre-determined criteria.

20 Claims, 10 Drawing Sheets

(56) References Cited

U.S. PATENT DOCUMENTS

| | | |
|---|---|---|
| 6,327,242 B1 | 12/2001 | Amicangioli |
| 6,522,656 B1 | 2/2003 | Gridley |
| 6,535,509 B2 | 3/2003 | Amicangioli |
| 6,963,575 B1 | 11/2005 | Sistanizadeh |
| 7,224,669 B2 | 5/2007 | Kagan |
| 7,230,947 B1 | 6/2007 | Huber |
| 7,500,004 B1 | 3/2009 | Homer |
| 7,636,703 B2 | 12/2009 | Taylor |
| 7,640,208 B2 | 12/2009 | Grossman |
| 7,640,298 B2 | 12/2009 | Berg |
| 7,660,793 B2 | 2/2010 | Indeck |
| 7,680,718 B2 | 3/2010 | Brandes |
| 7,685,281 B1 | 3/2010 | Saraiya |
| 7,702,629 B2 | 4/2010 | Cytron |
| 7,707,098 B2 | 4/2010 | West |
| 7,827,087 B2 | 11/2010 | Adatia |
| 7,840,481 B2 | 11/2010 | Aloe |
| 7,840,482 B2 | 11/2010 | Singla |
| 7,873,560 B2 | 1/2011 | Reich |
| 7,921,046 B2 | 4/2011 | Parsons |
| 7,945,528 B2 | 5/2011 | Cytron |
| 7,954,114 B2 | 5/2011 | Chamberlain |
| 8,014,274 B1 | 9/2011 | Amicangioli |
| 8,156,101 B2 | 4/2012 | Indeck |
| 8,295,221 B2 | 10/2012 | Matsumoto |
| 8,326,819 B2 | 12/2012 | Indeck |
| 8,374,986 B2 | 2/2013 | Indeck |
| 8,379,841 B2 | 2/2013 | Taylor |
| 8,407,122 B2 | 3/2013 | Parsons |
| 8,458,081 B2 | 6/2013 | Parsons |
| 8,478,680 B2 | 7/2013 | Parsons |
| 8,595,104 B2 | 11/2013 | Parsons |
| 8,600,856 B2 | 12/2013 | Parsons |
| 8,626,624 B2 | 1/2014 | Parsons |
| 8,655,764 B2 | 2/2014 | Parsons |
| 8,751,364 B2 | 6/2014 | Gaber |
| 8,762,249 B2 | 6/2014 | Taylor |
| 8,768,805 B2 | 7/2014 | Taylor |
| 8,843,408 B2 | 9/2014 | Singla |
| 8,879,570 B2 | 11/2014 | Nagapudi |
| 8,879,727 B2 | 11/2014 | Taylor |
| 8,921,046 B2 | 12/2014 | Bjornson |
| 9,047,243 B2 | 6/2015 | Taylor |
| 9,055,114 B1 | 6/2015 | Talaski |
| 9,246,876 B1 | 1/2016 | Melam |
| 9,501,795 B1 | 11/2016 | Gregory |
| 9,535,702 B2 | 1/2017 | Kodde |
| 9,582,831 B2 | 2/2017 | Parsons |
| 10,037,568 B2 | 7/2018 | Taylor |
| 10,062,115 B2 | 8/2018 | Taylor |
| 10,121,196 B2 | 11/2018 | Parsons |
| 10,169,814 B2 | 1/2019 | Parsons |
| 10,229,453 B2 | 3/2019 | Taylor |
| 10,269,071 B1 | 4/2019 | Friedman |
| 10,447,463 B2 | 10/2019 | Raymond |
| 10,650,452 B2 | 5/2020 | Parsons |
| 10,672,014 B2 | 6/2020 | Kodde |
| 10,846,795 B2 | 11/2020 | Kodde |
| 10,868,707 B1 | 12/2020 | Friedman |
| 10,872,078 B2 | 12/2020 | Parsons |
| 10,880,211 B2 | 12/2020 | Friedman |
| 11,182,856 B2 | 11/2021 | Parsons |
| 11,252,110 B1 | 2/2022 | Malin |
| 11,263,695 B2 | 3/2022 | Taylor |
| 11,301,408 B1 | 4/2022 | Friedman |
| 11,315,182 B2 | 4/2022 | Friedman |
| 11,349,700 B2 | 5/2022 | Friedman |
| 11,397,985 B2 | 7/2022 | Taylor |
| 11,431,628 B2 | 8/2022 | Friedman |
| 11,436,672 B2 | 9/2022 | Parsons |
| 11,551,302 B2 | 1/2023 | Gorham |
| 11,562,430 B2 | 1/2023 | Taylor |
| 11,631,135 B2 | 4/2023 | Gorham |
| 11,631,136 B2 | 4/2023 | Taylor |
| 11,676,206 B2 | 6/2023 | Taylor |
| 2001/0036196 A1 | 11/2001 | Blightman |
| 2002/0056039 A1 | 5/2002 | Lim |
| 2002/0156721 A1 | 10/2002 | Lyback |
| 2003/0097481 A1 | 5/2003 | Richter |
| 2003/0135670 A1 | 7/2003 | Anderson |
| 2004/0117438 A1 | 6/2004 | Considine |
| 2004/0236888 A1 | 11/2004 | Dieffenderfer |
| 2005/0122966 A1 | 6/2005 | Bowes |
| 2005/0232161 A1 | 10/2005 | Maufer |
| 2007/0038790 A1 | 2/2007 | Lee |
| 2007/0223448 A1 | 9/2007 | Tanazawa |
| 2007/0291753 A1 | 12/2007 | Romano |
| 2008/0013547 A1 | 1/2008 | Klessig |
| 2008/0212595 A1 | 9/2008 | Figueira |
| 2008/0243675 A1 | 10/2008 | Parsons |
| 2009/0157452 A1 | 6/2009 | Arora |
| 2010/0070839 A1 | 3/2010 | Shigihara |
| 2010/0082474 A1 | 4/2010 | Beaumont |
| 2010/0094743 A1 | 4/2010 | Robertson |
| 2010/0095277 A1 | 4/2010 | Cheng |
| 2010/0174770 A1 | 7/2010 | Pandya |
| 2010/0306387 A1 | 12/2010 | Ajima |
| 2011/0016221 A1 | 1/2011 | Amicangioli |
| 2011/0110266 A1 | 5/2011 | Li |
| 2011/0299409 A1 | 12/2011 | Vobbilisetty |
| 2012/0130919 A1* | 5/2012 | Gaber ............... G06Q 40/04 705/36 R |
| 2012/0151104 A1 | 6/2012 | Bratt |
| 2012/0166327 A1 | 6/2012 | Amicangioli |
| 2012/0184242 A1 | 7/2012 | Li |
| 2013/0091349 A1 | 4/2013 | Chopra |
| 2013/0107892 A1 | 5/2013 | Rubin |
| 2013/0117621 A1 | 5/2013 | Saraiya |
| 2013/0294231 A1 | 11/2013 | Nodir |
| 2014/0180904 A1* | 6/2014 | Parsons ............. G06Q 40/04 705/37 |
| 2014/0328354 A1 | 11/2014 | Michael |
| 2015/0019748 A1 | 1/2015 | Gross, IV |
| 2015/0095207 A1 | 4/2015 | Kodde |
| 2015/0124831 A1 | 5/2015 | Kumar |
| 2015/0127513 A1* | 5/2015 | Studnitzer .......... G06Q 40/04 705/37 |
| 2016/0261430 A1 | 9/2016 | Lepp |
| 2016/0262182 A1 | 9/2016 | Yang |
| 2016/0337086 A1 | 11/2016 | Shen |
| 2017/0005833 A1 | 1/2017 | Nishi |
| 2017/0147223 A1 | 5/2017 | Andre |
| 2017/0249079 A1 | 8/2017 | Mutha |
| 2017/0249608 A1* | 8/2017 | Rooke ............... G06Q 40/02 |
| 2017/0294991 A1 | 10/2017 | Brice |
| 2017/0346730 A1 | 11/2017 | Menon |
| 2017/0365002 A1* | 12/2017 | Maynard ............ G06Q 40/04 |
| 2018/0019943 A1 | 1/2018 | Gobriel et al. |
| 2018/0183901 A1* | 6/2018 | Lariviere .............. H04L 47/10 |
| 2018/0309595 A1 | 10/2018 | Ma |
| 2018/0338265 A1 | 11/2018 | Goel |
| 2019/0044890 A1 | 2/2019 | Underwood |
| 2019/0141614 A1 | 5/2019 | Wang |
| 2019/0188738 A1 | 6/2019 | Kodde |
| 2019/0205975 A1 | 7/2019 | Taylor |
| 2019/0268141 A1 | 8/2019 | Pandurangan et al. |
| 2019/0268445 A1 | 8/2019 | Zhang |
| 2019/0363857 A1 | 11/2019 | Hwang |
| 2019/0370215 A1 | 12/2019 | Pope |
| 2020/0045583 A1 | 2/2020 | Kim |
| 2020/0081864 A1 | 3/2020 | Roberts |
| 2020/0314009 A1 | 10/2020 | Goswami |
| 2020/0389835 A1 | 12/2020 | Talebi Fard |
| 2022/0256017 A1 | 8/2022 | Friedman |
| 2022/0377011 A1 | 11/2022 | Friedman |
| 2022/0391340 A1 | 12/2022 | Friedman |
| 2023/0044462 A1 | 2/2023 | Raymond |
| 2023/0129554 A1 | 4/2023 | Gorham |
| 2023/0162280 A1 | 5/2023 | Edward |

FOREIGN PATENT DOCUMENTS

| | | |
|---|---|---|
| JP | 2007-048280 A | 2/2007 |
| KR | 20130126833 A | 11/2013 |

(56) References Cited

FOREIGN PATENT DOCUMENTS

| WO | 2005107142 A1 | 11/2005 |
|---|---|---|
| WO | 2013148693 A1 | 10/2013 |
| WO | 2016130696 A1 | 8/2016 |

OTHER PUBLICATIONS

Agarwal et al., "Faster FAST: Multicore Acceleration of Streaming Financial Data," Computer Science Research and Development, May 2009, 11 pages, vol. 23.
Cut-Through and Store-and-Forward Ethernet Switching for Low-Latency Environments, Cisco Systems, Inc., 2008.
GE FANUC Intelligent Platforms, "WANic 5860 Packet Processors: Intelligent High-Performance 4-Port Gigabit Ethernet Packet Processor PCI-X Card," Copyright 2008, 2 pages.
Haas, The IEEE 1355 Standard: Developments, Performance and Application in High Energy Physics, Doctoral Thesis, University of Liverpool, Dec. 1998.
Intel 64 and IA-32 Architectures Optimization Reference Manual {Apr. 2012).
Janecek and Kabrhel, Matching Algorithms of International Exchanges, RSJ Invest, Dec. 1, 2007, available at: https://pdfslide.net/documents/matching-algorithms-of-international-exchanges.html.
Kermani and Kleinrock, Virtual Cut-Through: A New Computer Communication Switching Technique, North-Holland Publishing Company. Computer Networks 3, 1979, pp. 267-286.
Leber et al., "High Frequency Trading Acceleration Using FPGAs," 2011 International Conference on Field Programmable Logic and Applications (FPL), Sep. 2011, 6 pages.
Lockwood et al., "NetFPGA—An Open Platform for Gigabit-rate Network Switching and Routing," IEEE International Conference on Microelectronic Systems Education, Jun. 2007, 2 pages.
Market Access: Will a Naked Access Ban Raise Costs? Rules & Regs), Traders, James Ramage, May 3, 2010.
Moallemi et al., "The Cost of Latency," Jul. 19, 2011, 49 pages.
Morris et al., "FPGA Accelerated Low-Latency Market Data Feed Processing," 17th IEEE Symposium on High Performance Interconnects, 2009, 7 pages.
Nomura Holdings, Inc., "Nomura Launches Ultra-Low Latency NXT Product Suite in the US," News Release, [online], Nov. 9, 2010. Retrieved from the Internet at <URL: http://www.nomuraholdings.com/news/nr/americas/20101109/20101109.html>, 2 pages.
Sadoghi et al., "Efficient Event Processing Through Reconfigurable Hardware for Algorithmic Trading," Proceedings of the VLDB Endowment, 2010, 4 pages, vol. 3, No. 2.
Stevens, @. Richard, TCP/IP Illustrated, vol. 1 The Protocols, Addison-Wesley, Reading MA, 1994, pp. 17 and 223-228.
The Tabb Group, LLC, "The Value of a Millisecond: Finding the Optimal Speed of a Trading Infrastructure," Copyright 2008, 17 pages.
Trimberger and Moore, FPGA Security: Motivations, Features, and Applications, Proceedings of the IEEE, vol. 102, No. 8, Aug. 2014.
International Search Report issued in International Application No. PCT/US2021/036299, dated Oct. 21, 2021, 3 pages.
Written Opinion issued in International Application No. PCT/US2021/036299, dated Oct. 21, 2021, 4 pages.

\* cited by examiner

HARDWARE-BASED TRANSACTION EXCHANGE

CROSS-REFERENCE TO RELATED APPLICATIONS

This application is the U.S. national phase under 35 U.S.C. § 371 of International Application No. PCT/US2021/036299, filed Jun. 8, 2021, which claims priority to U.S. provisional patent application No. 63/035,993, filed Jun. 8, 2020, which are hereby incorporated by reference in their entirety.

BACKGROUND

Transaction exchanges include small or large computing systems that can be used to conduct transactions between two or more entities. These entities may transmit proposed transactions to an exchange, and the exchange may match the proposed transactions based on various criteria. Matched transactions may be carried out or otherwise fulfilled. A goal for an exchange is to be able to accurately carry out a large number of transactions per second.

Conventional and current exchanges operate in software. In previous years, when network speeds were slow, the networks were the bottleneck to attaining this goal. But with the deployment of gigabit and 10 gigabit Ethernet, as well as routers and switches that can operate at commensurate line speeds, the exchange software is now the bottleneck. The discrepancy in network versus exchange software speeds has become so great that proposals have been made to artificially slow down the network equipment (with what are colloquially referred to as "speed bumps") in order to prevent software exchanges from being overloaded.

SUMMARY

The embodiments herein overcome these and potentially other deficiencies with a custom hardware architecture that performs exchange functions that were previously performed in software. In order to scale the exchange to a point where it can keep up with the offered volume of transactions arriving via networks, custom field programmable gate arrays (FPGAs) are used to process data packets at high speed.

Particularly, exchange functionality is distributed onto three different types of components. A gateway component serves as ingress to the exchange and performs network protocol and application layer validation of proposed transactions. Any data packets containing invalid headers or proposed transactions are discarded. Data packets containing valid headers and proposed transactions are passed on to a routing component that directs the data packets, based on their transaction data, to one of several possible matching engine components. Each matching engine is dedicated to transactions of certain types or characteristics, and matches incoming transactions (e.g., in pairs) according to various algorithms. Matched transactions are fulfilled and confirmations are provided to the appropriate entities.

Advantageously, each of these components operates on an FPGA with purpose-built logic in order to perform its operations a line speed (e.g., up to 1-10 gigabits per second, or higher in some cases). Doing so eliminates the x86-64-based software bottleneck in today's exchanges. Also, removing the traditional software network stack processing in the exchange results in the exchange having fewer security vulnerabilities and makes any remaining security vulnerabilities much more difficult to exploit.

Accordingly, a first example embodiment may involve an FPGA based gateway comprising: (i) a first network interface configured to receive data packets containing proposed transactions, wherein the proposed transactions are respectively associated with transaction subjects, (ii) validation filter memory configured to store filter rules, and (iii) a sequence of validation logic circuitry configured to validate one or more headers or application-layer of the data packets in accordance with the filter rules, wherein at least one of sequence of validation logic circuitry is configured to validate a header of a respective data packet while another portion of the respective data packet is being received by the first network interface, and wherein the validation logic circuitry is further configured to discard any data packets that do not conform to the filter rules. The first example embodiment may also involve an FPGA based router comprising: (i) a second network interface configured to receive the data packets that were validated from the FPGA based gateway, (ii) a forwarding table with entries mapping header field or application-layer field values to destination addresses, and (iii) parsing and lookup circuitry configured to compare the header field or application-layer field values in the data packets to those in the forwarding table and determine one of the destination addresses for each of the data packets. The first example embodiment may also involve an FPGA based matching engine comprising: (i) a third network interface configured to receive the data packets from the FPGA based router, (ii) state memory containing information related to the proposed transactions, (iii) policy memory containing policies to be applied to the proposed transactions, (iv) transaction validation circuitry configured to validate the proposed transactions based on their related information from the state memory and the policies, wherein the transaction validation circuitry is further configured to discard any data packets containing proposed transactions that do not conform to the policies, (v) pending transaction memory configured to store proposed transactions that were validated, and (vi) matching algorithm circuitry configured to match pairs of pending transactions according to pre-determined criteria.

A second example embodiment may involve receiving, by way of a first network interface of an FPGA based gateway, data packets containing proposed transactions, wherein the proposed transactions are respectively associated with transaction subjects. The second example embodiment may further involve validating, by way of a sequence of validation logic circuitry of the FPGA based gateway, one or more headers or application-layer of the data packets in accordance with filter rules, wherein at least one of the sequence of validation logic circuitry is configured to validate a header of a respective data packet while another portion of the respective data packet is being received by the first network interface, and wherein the validation logic circuitry is further configured to discard any data packets that do not conform to the filter rules. The second example embodiment may further involve receiving, by way of a second network interface of an FPGA based router, the data packets that were validated from the FPGA based gateway. The second example embodiment may further involve comparing, by way of parsing and lookup circuitry of the FPGA based router, header field or application-layer field values in the data packets to those in a forwarding table with entries mapping the header field or application-layer field values to destination addresses, wherein the comparing determines one of the destination addresses for each of the data packets.

The second example embodiment may further involve receiving, by way of a third network interface of an FPGA based matching engine, the data packets from the FPGA based router. The second example embodiment may further involve validating, by way of transaction validation circuitry of the FPGA based matching engine, the proposed transactions based on their related information from state memory and policies to be applied to the proposed transactions, wherein the transaction validation circuitry is further configured to discard any data packets containing proposed transactions that do not conform to the policies. The second example embodiment may further involve matching, by way of matching algorithm circuitry of the FPGA based matching engine, pairs of pending transactions according to pre-determined criteria, wherein the pending transactions are proposed transactions that were validated and stored in pending transaction memory.

A third example embodiment may involve an FPGA based gateway comprising: a network interface configured to receive data packets containing proposed transactions, wherein the proposed transactions are respectively associated with transaction subjects; validation filter memory configured to store filter rules; and a sequence of validation logic circuitry configured to validate one or more headers or application-layer of the data packets in accordance with the filter rules, wherein at least one of the sequence of validation logic circuitry is configured to validate a header of a respective data packet while another portion of the respective data packet is being received by the network interface, and wherein the validation logic circuitry is further configured to discard any data packets that do not conform to the filter rules.

A fourth example embodiment may involve receiving, by way of a network interface of an FPGA based gateway, data packets containing proposed transactions, wherein the proposed transactions are respectively associated with transaction subjects. The fourth example embodiment may further involve validating, by way of a sequence of validation logic circuitry of the FPGA based gateway, one or more headers or application-layer of the data packets in accordance with filter rules, wherein at least one of the sequence of validation logic circuitry is configured to validate a header of a respective data packet while another portion of the respective data packet is being received by the network interface, and wherein the validation logic circuitry is further configured to discard any data packets that do not conform to the filter rules.

A fifth example embodiment may involve an FPGA based router comprising: a network interface configured to receive data packets that were validated by an FPGA based gateway; a forwarding table with entries mapping header field or application-layer field values to destination addresses; and parsing and lookup circuitry configured to compare the header field or application-layer field values in the data packets to those in the forwarding table and determine one of the destination addresses for each of the data packets.

A sixth example embodiment may involve receiving, by way of a network interface of an FPGA based router, data packets that were validated by an FPGA based gateway. The sixth example embodiment may also involve comparing, by way of a parsing and lookup circuitry of the FPGA based router, header field or application-layer field values in the data packets to those in a forwarding table with entries mapping the header field or application-layer field values to destination addresses, wherein the comparing determines one of the destination addresses for each of the data packets.

A seventh example embodiment may involve an FPGA based matching engine comprising: a network interface configured to receive data packets containing proposed transactions, wherein the proposed transactions are respectively associated with transaction subjects; state memory containing information related to the proposed transactions; policy memory containing policies to be applied to the proposed transactions; transaction validation circuitry configured to validate the proposed transactions based on their related information from the state memory and the policies, wherein the transaction validation circuitry is further configured to discard any data packets containing proposed transactions that do not conform to the policies; pending transaction memory configured to store proposed transactions that were validated; and matching algorithm circuitry configured to match pairs of pending transactions according to pre-determined criteria.

An eighth example embodiment may involve receiving, by way of a network interface of an FPGA based matching engine, data packets containing proposed transactions, wherein the proposed transactions are respectively associated with transaction subjects. The eighth example embodiment may involve validating, by way of transaction validation circuitry of the FPGA based matching engine, the proposed transactions based on their related information from state memory and policies to be applied to the proposed transactions, wherein the transaction validation circuitry is further configured to discard any data packets containing proposed transactions that do not conform to the policies. The eighth example embodiment may involve matching, by way of matching algorithm circuitry of the FPGA based matching engine, pairs of pending transactions according to pre-determined criteria, wherein the pending transactions are proposed transactions that were validated stored in pending transaction memory.

In a ninth example embodiment, an article of manufacture may include a non-transitory computer-readable medium, having stored thereon program instructions that, upon execution by a computing system, cause the computing system to perform operations in accordance with any of the previous example embodiments.

In a tenth example embodiment, a computing system may include at least one processor, as well as memory and program instructions. The program instructions may be stored in the memory, and upon execution by the at least one processor, cause the computing system to perform operations in accordance with any of the previous example embodiments.

In an eleventh example embodiment, a system may include various means for carrying out each of the operations of any of the previous example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Use of the term "or" may refer to one, the other, or both of the operands that the term joins. For example, "A or B" refers to just "A", just "B", or "A and B". Use of the term "or" with three or more operands is to be interpreted similarly.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Network Environment

Figure 1:
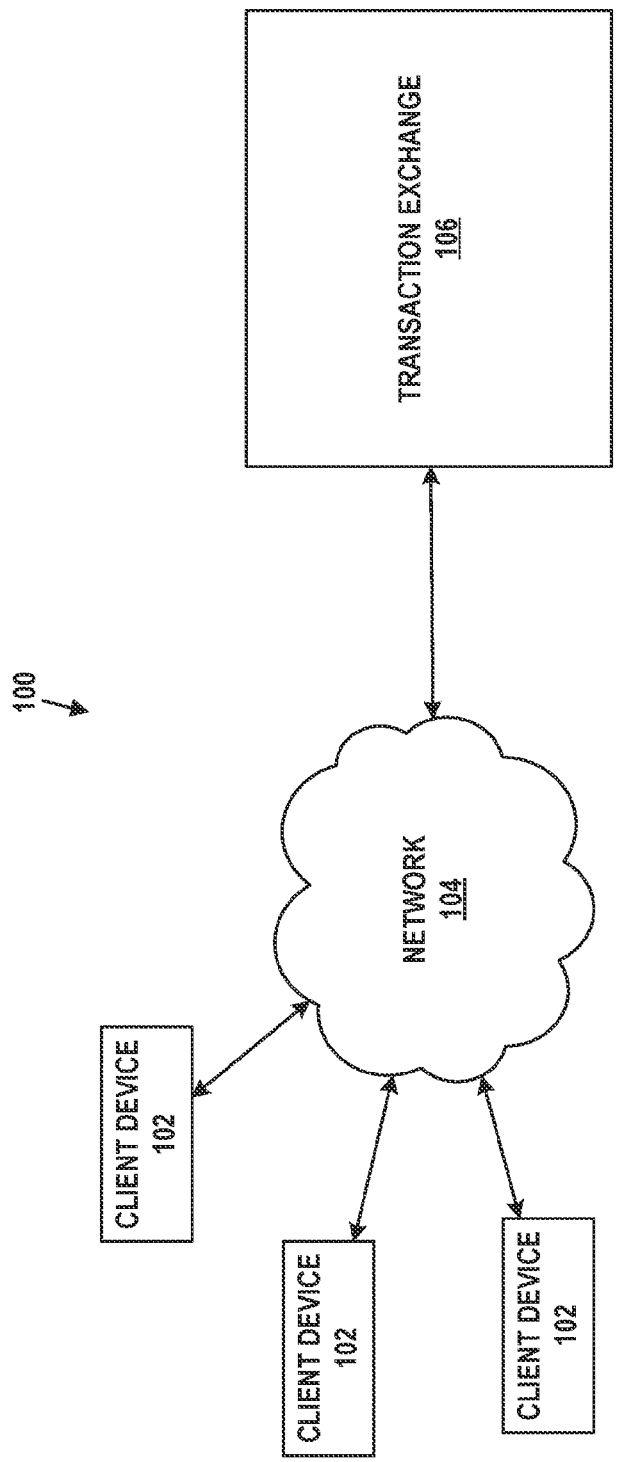
FIG. 1 depicts a transaction exchange connected to a network and in communication with client devices, in accordance with example embodiments.

FIG. 1 depicts an example system 100 that contains client devices 102, network 104, and transaction exchange 106. In various embodiments, more or fewer components may be present.

Client devices 102 may be any combination of hardware and/or software that can generate transaction proposals and/or receive confirmations, rejections, or errors. Thus, client devices 102 may include software applications operating on a standard personal computer or server, as well as platforms based on dedicated hardware. While three of client devices 102 are shown in FIG. 1, more or fewer may be present. Some or all of client devices 102 may operate independently from one another, or may cooperate in some fashion.

Network 104 may be a packet-switched or circuit-switched data network, such as the Internet or another type of private or public Internet Protocol (IP) network. Thus, network 104 could include one or more local-area networks, wide-area networks, or some combination thereof. Network 104 connects client devices 102 to transaction exchange 106 such that transaction proposals from client devices 102 may be received by transaction exchange 106, and response messages from transaction exchange 106 (e.g., confirmations, rejections, errors) may be received by client devices 102. In some embodiments, network 104 may be configured to be able to sustain very high data rates between client devices 102 and transaction exchange 106, such a 1 gigabit per second, 10 gigabits per second, or even higher data rates.

Transaction exchange 106 (also referred to as "exchange 106" for purposes of simplicity) may include one or more computing devices or computing components arranged to carry out transactions proposed by client devices 102. Thus, in some embodiments, exchange 106 may receive transaction proposals from client devices 102 and match these proposals in a pairwise fashion to facilitate their completion.

For example, the transaction proposals may entail orders for traded securities. An order may include an identifier of the security (e.g., a ticker symbol), a side (e.g., buy long, buy cover, sell long, sell short), a number of units of the security (e.g., 100 shares), a type of order (e.g., market or limit), and a proposed price (e.g., $50.00) among other possible values. This information may be encoded in various ways, for example in text fields and/or binary fields.

Other types of transactions may be supported, such as task scheduling on distributed systems, auctions, exchange of cryptocurrencies for fiat currencies or other items of value, the sale and purchase of non-fungible tokens (NFTs), and so on. Any sort of market where buyers and seller come together to place bids or offers (propose transactions) that can be fulfilled could be supported.

Exchange 106 matches transaction proposals according to a set of rules (e.g., algorithms) in order to carry out the transactions. Such rules can vary in scope and complexity. Generally, a buy order and a sell order can be matched when the price of the buy order meets or exceeds the price of the sell order.

As an example, price/time based algorithms match incoming transaction proposals in a first-in-first-out (FIFO) manner where buy orders are matched to sell orders according to their price and time of arrival. Buy orders are given priority in decreasing order of price (e.g., orders with a higher price have a higher relative priority). If two or more buy orders are for the same price, priority is given to these orders based on their times of arrival (e.g., orders that arrived earlier have higher relative priority).

As another example, pro-rata based algorithms also give priority to buy orders with the highest prices. However, buy orders with the same price are matched to sell orders in proportion to order size. Suppose, for instance, that buy orders for 300 shares and 100 shares of the same security have been received, and that a sell order for 300 shares of the same security arrives. A pro-rata algorithm could match 225 shares of the 300-share buy order and 75 shares of the 100-share buy order to the sell order. Thus, 75% of each buy order was fulfilled.

Other matching algorithms of various levels of complexity may be supported by exchange 106. Further, different matching algorithms may be supported in parallel by exchange 106 for different securities, different exchange entities, or different transaction pools. For example, exchange 106 may be virtualized into multiple slices, each slice being a logical exchange. In some embodiments, various securities may be distributed across these slices so that each security can only be traded on one particular slice. In other embodiments, different slices may operate as independent exchanges under the control of a particular agency, broker, or unaffiliated electronic market. In still more embodiments, some slices may be so-called "dark pools", or private exchanges only accessible to a limited number of institutional entities, while others may be "light pools", or public exchanges available to virtual any entity. Each slice may operate its own matching engine that executes one or more matching algorithms independently of the other slices.

Given the complexity of handling multiple slices and various matching algorithms, exchanges have traditionally been implemented in software. As noted above, however, network data rates have grown by orders of magnitude in the past few decades. While computing hardware has also increased in speed and capacity, this increase has not, on a relative basis, kept pace with improvements in networking technology. Exchange x86-64-based software is still a bottleneck on overall exchange throughput.

Advantageously, implementing exchange 106 in hardware, such as FPGAs, allows exchange 106 to operate at network speed. Further, the purpose-built nature of the logic deployed to FPGAs facilitate more efficiencies, such as bypassing the overhead of data packets traversing a traditional network protocol stack in software or hardware bus methods such as Peripheral Component Interconnect express (PCIe) which provide interconnectivity between the x86-64-based resources and the physical network interface. Additionally, the FPGA implementation herein renders exchange 106 less susceptible to well-known or novel security vulnerabilities, such as those based on quirks of certain operating systems, applications, processes, or libraries.

II. Example Hardware Exchange Architecture

Figure 2:
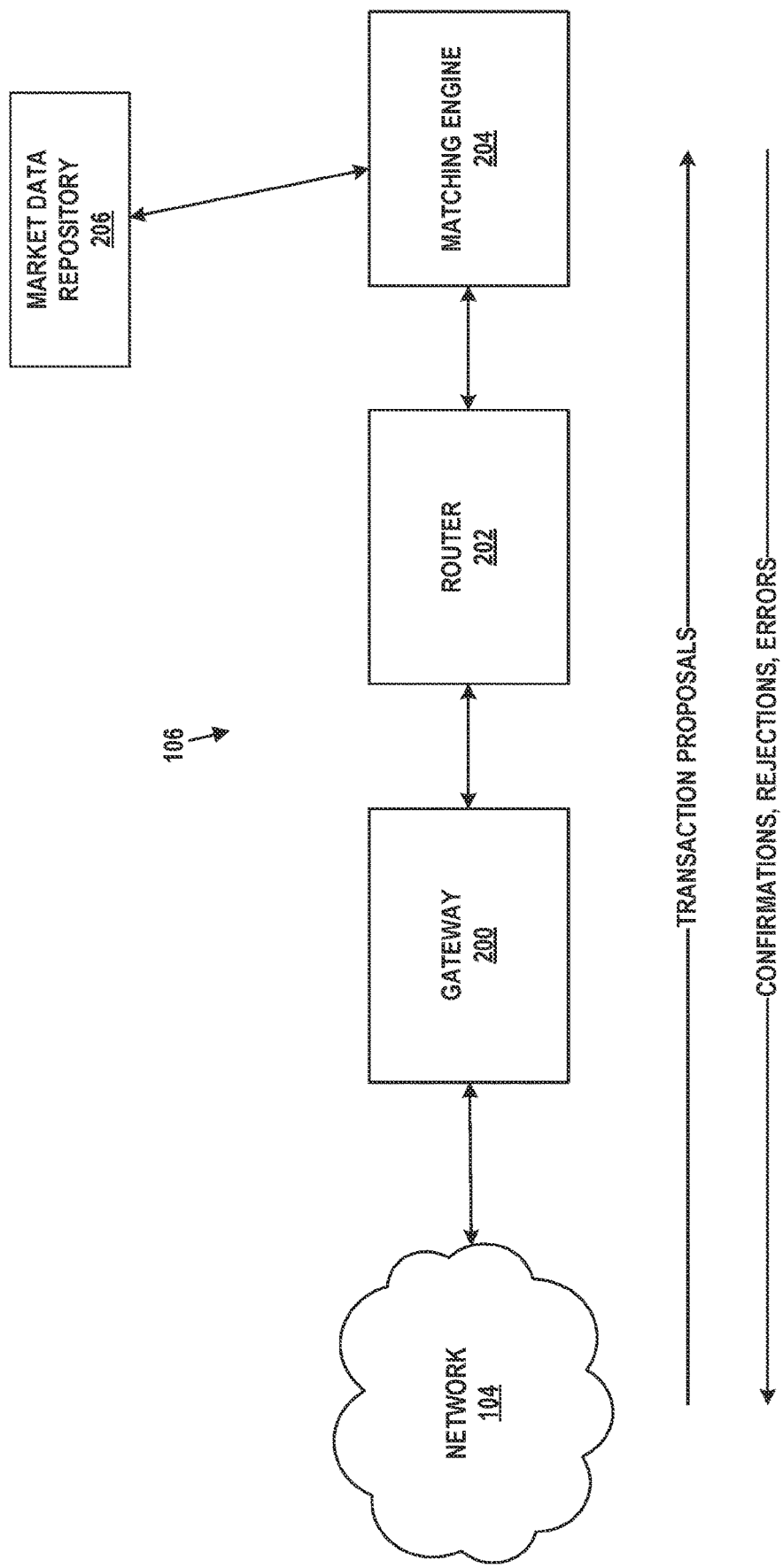
FIG. 2 depicts an architecture for an example exchange, in accordance with example embodiments.

To that point, an example hardware-based architecture for exchange 106 is shown in FIG. 2. Particularly, the functionality of exchange 106 is divided into three logical components—gateway 200, router 202, and matching engine 204. Also shown in FIG. 2 are network 104 and market data repository 206.

To facilitate understanding of these embodiments, it is assumed that gateway 200 is configured to receive data packets in the form of Ethernet frames from network 104. These frames may contain 176 bits of Ethernet header, followed by 160 bits of IP header. The IP header may be followed by either 160 bits of TCP header, or 64 bits of UDP header. The TCP header or the UDP header may be followed by n bits of application-layer data, where n may vary based on the application and type of transaction. For example, 64 bits of application-layer data could be used for a binary or textual encoding of the identifier of the security, a side, a number of units of the security, a type of order, and a proposed price. These numbers assume that no virtual local area network (VLAN) tags, optional IP headers, or optional TCP headers are used, each of which could increase their respective Ethernet, IP, or TCP header lengths. Nonetheless the embodiments herein could handle different header arrangements as well as different types of headers.

A high-level overview of the functionality of gateway 200, router 202, and matching engine 204 is provided immediately below. More technical detail regarding their implementation is provided later in this specification. In general, however, transaction proposals flow from left to right in FIG. 2, i.e., from network 104 to gateway 200, router 202, and then matching engine 204. Conversely, confirmations, rejections, and/or errors related to transaction proposals flow from right to left in FIG. 2, e.g., from any of gateway 200, router 202, or matching engine 202 to network 104. It is assumed but not shown in FIG. 2 that gateway 200, router 202, and matching engine 204 are connected by way of one or more local area networks.

A. Gateway

Gateway 200 serves as a form of application-specific firewall for exchange 106. Gateway 200 is configured to only permit certain types of valid proposed transactions into exchange 106. Gateway 200 is implemented using FPGA technology to receive data packets from network 104 as a bit stream, and to validate portions of the data packets in a cut-through or pipelined fashion.

Thus, for example, gateway 200 may be configured to validate a standard Ethernet header as soon as it receives the first 176 bits of an Ethernet frame. Alternatively, gateway 200 may be configured to validate each field of the frame as it arrives (first validating that the destination Ethernet address is properly configured on gateway 200, then that the source Ethernet address is in a whitelist of addresses that gateway 200 is permitted to communicate with, and so on. Similar procedures can be carried out for IP, TCP, and/or UDP headers.

For the application-layer data, gateway 200 checks its n bits to ensure that the transaction encoded therein appears to be valid. For example, this may involve validating that the security is known and supported, the side is properly specified, the number units is within a reasonable range of values, the type of order is permitted, and the proposed price is within a reasonable range of values. In some cases, these checks may involve considering values of the application-layer data and one or more of the headers. For instance, a check could be configured such that a sell order from the client device at IP address 10.154.34.172 is permitted only for certain securities and/or with a volume of no more than 1000 units.

If gateway 200 finds that all of the headers/fields that it checks are valid, then gateway 200 transmits the data packet contained within the Ethernet frame to router 202. If one or more of these checks fail, gateway 200 may stop further validation processing of the Ethernet frame, log the detected error to a log file or external destination (not shown) and discard the frame. In this way, only data packets containing proposed transactions that are highly likely to be valid are provided for further processing by exchange 106. Any non-conforming data packets are discarded upon ingress, reducing the processing required at exchange 106 while also increasing its security. As such, gateway 200 (and possibly one or more other gateways performing similar functions) form a hardened security perimeter around the rest of exchange 106.

B. Router

Router 202 receives incoming data packets from gateway 200 and forwards them on to matching engine 204. Particularly, router 202 may skip some or all header and/or application-layer validations that were performed by gateway 200 and instead identify information regarding the proposed transaction in the application-layer data. This information may be used to route the data packets to a particular slice of matching engine.

For example, router 202 may perform cut-through validation of Ethernet header fields as they arrive in frames. If these validations pass, then router 202 may refrain from validating any IP, TCP, or UDP headers, as those were already validated by gateway 200. Likewise, router 202 may refrain from validating the application-layer data. But, router 202 may use one or more fields of the headers or application-layer data to route a given data packet to an appropriate slice of matching engine 204.

As one possible example, router 202 may consider the source IP address and identifier of the security to determine the slice. Router 202 may be configured to route transaction proposals from certain IP addresses and related to a particular security to a slice supporting a dark pool, and all other transaction proposals related to this security to a slice supporting a light pool.

To facilitate this routing, router 202 may be configured with a forwarding table, each entry of which indicating values of information fields within incoming data packets and an associated slice. Once the information fields in an incoming data packet are read, router 202 may search for a matching entry in the forwarding table. If one is found, the data packet is routed to the appropriate slice. If there is no match, a default entry may be applied to route the data packet to a default slice, or the data packet may be discard and an error logged.

C. Matching Engine

As discussed, matching engine 204 matches transactions according to matching rules. These rules may be implemented independently per slice as algorithms with various levels of complexity.

Not unlike router 202, matching engine 204 may skip some or all packet header validations that were performed by gateway 200. For example, matching engine 204 may perform cut-through validation of Ethernet header fields as they arrive in frames. If these validations pass, then matching engine 204 may refrain from validating any IP, TCP, or UDP headers, as those were already validated by gateway 200.

To support matching across multiple slices, proposed transactions may be stored in memory (e.g., dynamic random access memory (DRAM)) in matching engine 204 until they are fulfilled or expire. Each proposed transaction as stored may include information (identifier of the security, a side, a number of units of the security, a type of order, and a proposed price) as well as an indicator of the slice to which the proposed transaction belongs. Proposed transactions may be stored in various ways, for instance in sorted or unsorted data structures or in tables organized per slice.

Upon receiving a new incoming proposed transaction, matching engine 204 may validate the proposed transaction. This may be a similar set of application-layer validations that were carried out by gateway 200 (e.g., the security is known and supported, the side is properly specified, the number units is within a reasonable range of values, the type of order is permitted, and the proposed price is within a reasonable range of values), but also include more stateful validations.

For instance, exchange 106 may limit the total number of transactions per a time period for a given client device, or may limit the total value of transactions per a time period for the client device. As an example of the latter, exchange 106 may be configured to prevent sales of more than $100,000 of any one security during a day for a particular client device. Thus, matching engine 204 would need to maintain state, for the client device, relating to the total value of transactions performed involving the security. If a proposed transaction would exceed the $100,000 threshold, the proposed transaction would be rejected. Other examples of state-based validations may be possible.

Once the proposed transaction is validated, matching engine 204 may execute the associated rules to determine whether there is a match for this proposed transaction. If there is, the transaction is carried out and confirmations are sent to the originating client devices. The transaction may be logged and the proposed transactions deleted from the slice. If there is not, the slice may queue the proposed transaction for a period of time so that it can be fulfilled later.

If a pending transaction is queued for more than a predetermined duration (e.g., 1 minute, 10 minutes, 60 minutes, until the end of the trading day), it may expire. Proposed transactions that expire may also be logged and a rejection may be sent to the originating client device.

Market data repository 206 may be one or more databases or data sources accessible to matching engine 204. Market data repository 206 may provide lists of supported or unsupported securities, updates to matching rules, up to date security pricing data, and other information usable by matching engine 204. One of the advantages of the hardware-based system described herein is that it can update market data repository with information about fulfilled transactions in nanoseconds rather than milliseconds as is the case for traditional techniques. Thus, market data can be distributed faster and more accurately.

III. Enclosure-Based Exchange Implementation

In some embodiment, components of exchange 106 may be implemented on cards that can be plugged into computing enclosures, such as a 4 U or 6 U rack-mountable chassis. Such an enclosure may provide power, ventilation, backplane communication, and physical protection to one or more cards that can be placed therein. Each card may slide into a slot on the backplane and be connected to the enclosure's power supply and communication bus by way of the slot.

Figure 3A:
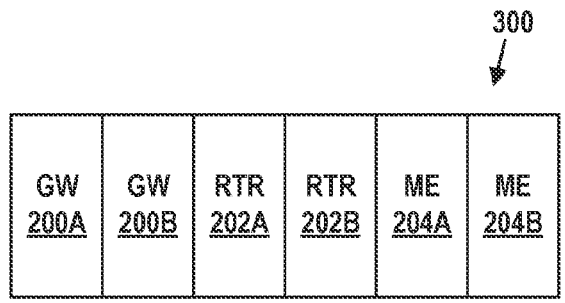
FIG. 3A depicts a possible enclosure-based implementation of a transaction exchange, in accordance with example embodiments.
Figure 3B:
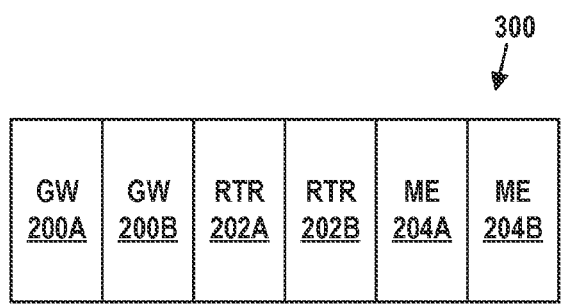
FIG. 3B depicts another possible enclosure-based implementation of a transaction exchange, in accordance with example embodiments.
Figure 3B:
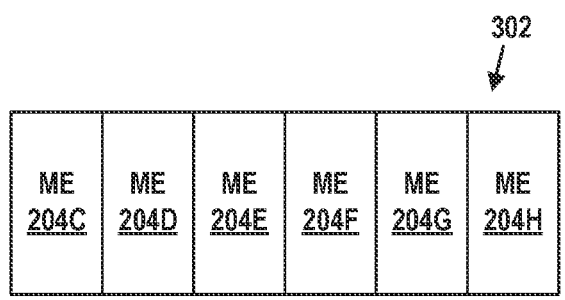

FIGS. 3A and 3B depict front views of enclosure-based arrangements of exchange 106. Each exchange component, gateway 200, router 202, and matching engine 204, may be implemented on a standalone card. Thus, various combinations of cards may be deployed in enclosures.

As an example FIG. 3A depicts an enclosure 300 containing six cards, gateway (GW) 200A, gateway 200B, router (RTR) 202A, router 202B, matching engine (ME) 204A, and matching engine 204B. Each type of card may be deployed in pairs as shown so that they exhibit 1:1 redundancy. Thus, gateways 200A and 200B are a redundant pair, routers 202A and 202B are a redundant pair, and matching engines 204A and 204B are a redundant pair. Not shown in FIG. 3A or 3B, for sake of simplicity, is any cabling connecting the cards to one another or to other devices.

Such a redundant pair may operate in an active-backup arrangement in which one card of the pair is actively performing operations and the other is ready to take over operations should the active card fail or be removed. For example, gateway 200A may be active and gateway 200B may be backup. Thus, gateway 200A may be receiving incoming data packets and performing the gateway functions described herein, including forwarding at least some of these data packets to the active router. Gateway 200B may also be receiving the same incoming data packets, e.g., by way of an Ethernet tap upstream of both gateway 200A and 200B. But gateway 200B might not fully process these data packets and ultimately will discard these packets since it is in backup mode. Nonetheless, gateway 200B may maintain enough state so that it can take over for gateway 200A as the active gateway.

Such a switchover may occur if gateway 200A fails (e.g., fails to reply to a keep-alive heartbeat by way of the communication bus or an Ethernet port) or may be triggered by manual override. Upon switching over, gateway 200B becomes the active gateway and begins fully processing incoming packets in accordance with gateway functions. Gateway 200A either becomes the backup gateway, operating in the fashion previously described for gateway 200B, or is placed in a failed state.

In an analogous fashion, routers 202A and 202B may be a redundant pair, and matching engines 204A and 204B may also be a redundant pair. For example, router 202A may be active while router 202B is backup, and matching engine 204A may be active while matching engine 204B is backup.

In some embodiments, gateway, router, and/or matching engine cards may be placed in N:1 redundant arrangements, where N is typically between 2 and 5, inclusive. In these cases, if any of N active cards of a given type fails, a single backup card of the same type will become active and take over its operations.

Further, any of the cards in chassis 300 may be hot-swappable, in that a card can be removed from chassis 300 without having to power off any other cards or chassis 300 as a whole. In this way, a faulty card can be replaced without impacting operation of the other cards.

FIG. 3B depicts a dual-enclosure arrangement. In this case, enclosure 300 contains six cards as described above, and enclosure 302 contains six additional cards for matching engines 204C, 204D, 204E, 204F, 204G, and 204H. The matching engine cards of enclosure 302 may be arranged in a 1:1 redundant fashion as described above. For example, matching engines 204C and 204D may be a redundant pair, matching engines 204E and 204F may be a redundant pair, and matching engines 204G and 204H may be a redundant pair. Alternatively, N:1 redundancy may be applied. Again, the cabling between cards in enclosure 302, as well as any between enclosures 300 and 302, is omitted.

Some further embodiments not shown involve gateway, router, and/or matching engine cards being deployed in computing enclosures with third-party cards. For example, a matching engine may be placed in a computing chassis that supports one or more general-purpose computing cards configured to execute applications atop a LINUX® or WINDOWS® operating system. Such an enclosure may also include one or more storage cards containing solid state drives or hard disk drives. These applications may communicate with or otherwise be integrated with the matching engine.

Regardless, the modular components of exchange 106 allows the functions of the exchange to be independently scaled. For instance, matching engines cards may each support less throughput than a single gateway card or router card, so two, three, or more matching engine cards may be deployed for each gateway and router card. Other arrangements are possible.

IV. Example FPGA-Based Exchange Components

An FPGA represents an arrangement of hardware logic disposed upon a printed circuit board (PCB), for example. In some embodiments, other types of integrated circuit technology, such as an application-specific integrated circuit (ASIC), could be used in place of an FPGA. Regardless, an FPGA may include a number of hardware logic blocks and interconnections between these blocks. In some embodiments, memory (e.g., DRAM, flash, or other types of volatile storage or non-volatile storage), one or more processors (e.g., general purpose processors, graphical processors, encryption processors, and/or network processors), clocks, and network interfaces may be placed on or may interact with an FPGA.

As noted above, each of gateway 200, router 202, and matching engine 204 may be implemented using FPGA technology. In the following sections, the focus is on the hardware blocks that support the functionality being provided by gateway 200, router 202, and matching engine 204. Thus, for sake of simplicity some modules (e.g., clocks, redundancy-supporting circuitry, and certain types of memory) may be omitted.

A. Gateway FPGA

Figure 4:
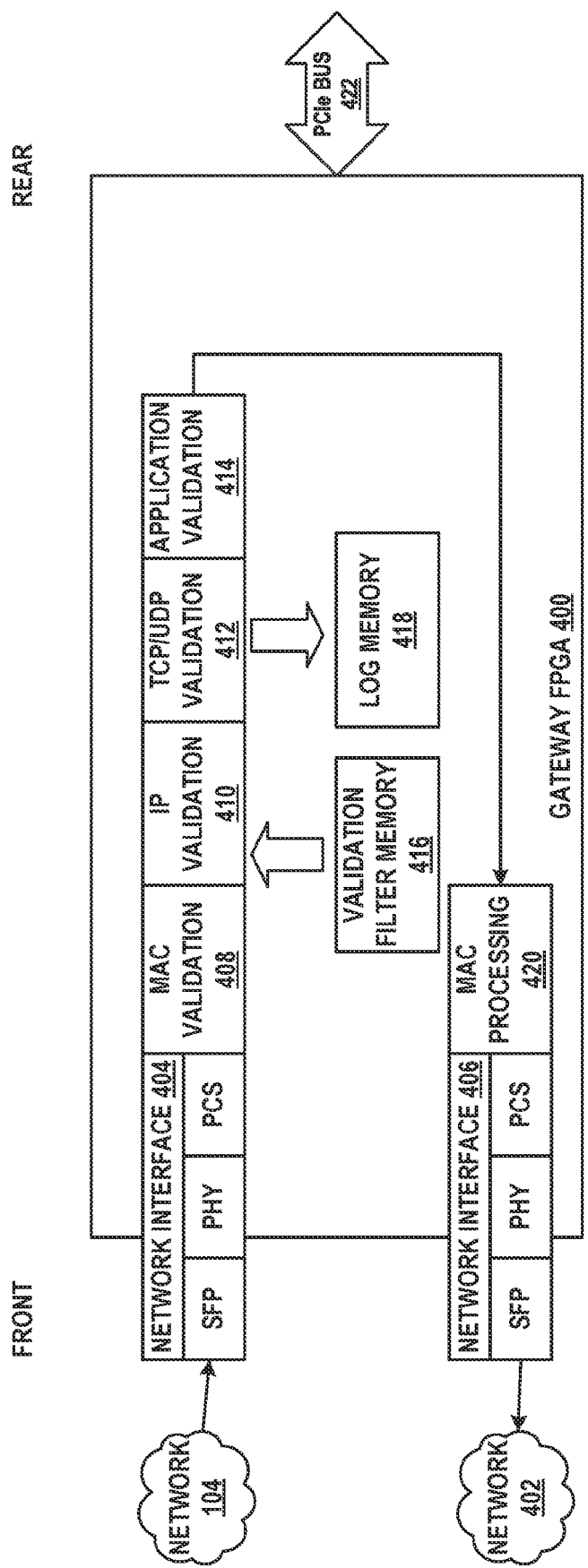
FIG. 4 depicts an example FPGA-based gateway component, in accordance with example embodiments.

FIG. 4 depicts an example gateway FPGA 400, configured to perform operations of gateway 200. Gateway FPGA 400 is shown containing network interfaces, protocol validation logic, memory, and protocol processing logic. As discussed, however, gateway FPGA 400 may contain additional components. Further, FIG. 4 depicts a logical schematic and may not be drawn to scale.

The front of gateway FPGA 400 contains two network interfaces, network interface 404 and network interface 406. Each may include one or more physical ports (e.g., gigabit Ethernet, 10 gigabit Ethernet, 25 gigabit Ethernet, among others), though only one port for each is shown. Network interface 404 connects to network 104 and from it receives incoming data packets in the form of Ethernet frames. Network interface 406 connects to network 402 and on it transmits incoming data packets in the form of Ethernet frames to a router or another exchange component. Thus, network 402 may be a network internal to exchange 106.

Each of network interface 404 and network interface 406 may include a small form-factor pluggable (SFP) transceiver module, a physical layer (PHY) module, and a physical coding sublayer (PCS) module. In some embodiments, an SFP+, SFP28, QSFP+, or QSFP28 transceiver could be used in place of the SFP transceiver module.

Data packets incoming to exchange 106 may traverse gateway FPGA 400 in accordance with the arrows of FIG. 4. Notably, at least MAC validation module 408, IP validation module 410, TCP/UDP validation module 412, and application validation module 414 may operate on incoming data packets (arranged as Ethernet frames) as bitstreams. There may be little buffering of such bits in these modules, and an entire data packet need not be received before a module can process parts of the data packet that are received.

In other words, MAC validation module 408 may receive the first 176 bits of an Ethernet frame containing an incoming data packet. These bits would encode the Ethernet header. Based on fixed offsets within these 176 bits, MAC validation module 408 may be able to identify the 6-byte destination address, 6-byte source address, and 2-byte ethertype fields. If VLAN tags are used, then some parsing of these tags may be required to locate information that is not at fixed offsets.

MAC validation module 408 may perform validations based on the content of these fields as soon as the first 176 bits of the Ethernet frame are received, or as each bit is received. Thus, processing of these 176 bits and reception of subsequent bits of the Ethernet frame may occur in parallel. The validations performed may be based on filters defined in validation filter memory 416. This unit of memory may be DRAM, for example, storing a set of MAC-layer filter rules.

These filters may whitelist (allow) or blacklist (deny) various combinations destination addresses, source addresses, and/or ethertype fields. In some embodiments, only whitelist rules are used and any data packet with an Ethernet frame not matching a whitelist rule would be discarded. In other embodiments, only blacklist rules are used and any data packet with an Ethernet frame matching a blacklist rule may be discarded.

As an example, a whitelist may be configured to only allow incoming data packets that are from a specific set of source addresses, that are transmitted to a particular destination address, and have an ethertype indicating that the Ethernet frame encapsulates an IP packet. All other packets may be discarded. Other filtering possibilities exist.

When a data packet is discarded, information related to the data packet (e.g., at least some of its header values) may be written to log memory 418. This unit of memory may also be DRAM, for example. Periodically or from time to time, log memory 418 may be rotated or flushed, and/or may operate in a first-in-first-out fashion where the oldest log entry is overwritten by the newest entry when log memory 418 is full. Further, a rejection or error message may be transmitted to the sending client device (not shown in FIG. 4).

MAC validation module 408 may serve to decapsulate incoming data packets by removing their Ethernet headers. However, the values of certain fields of these headers may be maintained in metadata that accompanies the data packet as it traverses other modules of gateway FPGA 400.

After MAC validation module 408 processing, IP validation module 410 may receive the 160 bits of the incoming data packet containing the IP header. In some cases, IP validation module 410 may also receive the bits of the Ethernet header or metadata representing these bits as well.

It is again assumed that no optional IP header sections are used, but if they are present IP validation module 410 may be configured to parse and validate these as well. Based on fixed offsets within these 160 bits, IP validation module 410 may be able to identify the version, header length, type of service, total length, identification, flags, fragment offset, time to live, protocol, header checksum fields, source IP address, and destination IP address fields.

IP validation module 410 may perform validations based on the content of these fields as soon as the 160 bits of the IP header are received. Thus, processing of these 160 bits and reception of subsequent bits of the data packet may occur in parallel. Not unlike MAC validation module 408, the validations performed may be based on filters defined in validation filter memory 416.

These filters may whitelist (allow) or blacklist (deny) various combinations Ethernet and/or IP header fields. As an example, a blacklist may be configured to discard all data packets from a particular set of source IP addresses. Alternatively or additionally, the blacklist may contain a rule to discard any data packets that are fragmented (as indicated by the flags and/or fragmentation offset fields). Additionally, IP validation module 410 may validate that the IP header checksum is correct. If it is not correct, the data packet may be discarded. Other filtering possibilities exist.

As noted above, information related to discarded data packets may be written to log memory 418. Further, a rejection or error message may be transmitted to the sending client device (not shown in FIG. 4).

After IP validation module 410 processing, TCP/UDP validation module 412 may receive the 160 bits of the incoming data packet containing the TCP header or the 64 bits of the incoming data packet containing the UDP header. In some cases, TCP/UDP validation module 412 may also receive the bits of the Ethernet and/or IP headers (or representative metadata) as well.

TCP/UDP validation module 412 represents validation for both TCP and UDP headers, and may be implemented as two separate modules in practice. But it is shown as one in FIG. 4 for purposes of simplicity. In the case of separate modules for TCP header and UDP header validation, one of these modules may be selected based on the value of the protocol field in the IP header. It is again assumed that no optional TCP header sections are used, but if they are present TCP/UDP validation module 412 may be configured to parse and validate these as well.

In the case of a TCP header, based on fixed offsets within its 160 bits, TCP/UDP validation module 412 may be able to identify the source port, destination port, sequence number, acknowledgement number, offset, reserved, flags, window size, checksum, and urgent pointer fields. In the case of a UDP header, based on fixed offsets within its 64 bits, TCP/UDP validation module 412 may be able to identify the source port, destination port, length, and checksum fields.

TCP/UDP validation module 412 may perform validations based on the content of these fields as soon as the 160 bits or 64 bits of the TCP header or UDP header is received. Thus, processing of these bits and reception of subsequent bits of the data packet may occur in parallel. Not unlike MAC validation module 408 and IP validation module 410, the validations performed may be based on filters defined in validation filter memory 416.

These filters may whitelist (allow) or blacklist (deny) various combinations Ethernet IP, or TCP/UDP header fields. As an example, a blacklist may be configured to discard all data packets that are not directed to a specific one of several destination IP address/destination port combinations used by exchange 106. Alternatively or additionally, the blacklist may contain a rule to discard any data packets with the TCP urgent pointer set to a value other than zero. Other filtering possibilities exist.

As noted above, information related to discarded data packets may be written to log memory 418. Further, a rejection or error message may be transmitted to the sending client device (not shown in FIG. 4).

After TCP/UDP validation module 412 processing, application validation module 414 may receive the n bits of the incoming data packet containing the application data. In some cases, application validation module 414 may also receive the bits of the Ethernet, IP, and/or TCP/UDP headers as well.

Depending on how the application data is arranged, application validation module 414 may either identify the fields therein based on fixed offsets or by parsing the application data in linear or semi-linear fashion. By way of these techniques, a proposed transaction (defined by e.g., an identifier of the security, a side, a number of units of the security, a type of order, and a proposed price) may be determined.

TABLE 1

| FieldName | FieldLength | PosStart | PosEnd | Rules | Description |
|---|---|---|---|---|---|
| Sy | 17 | 0 | 16 | Value Transmitted as Binary | Symbol |
| Si | 9 | 17 | 18 | BL = 00; BC = 01; SL = 10; SS = 11 | Side |
| Qt | 20 | 19 | 38 | Quantity Transmitted as Binary | Quantity |
| Px.P | 1 | 39 | 39 | <0 = 0; >0 = 1 | Positive/negative indicator |
| Px.L | 20 | 40 | 59 | Value Transmitted as Binary | Price (left of decimal) |
| Px.R | 4 | 60 | 63 | Value Transmitted as Binary | Price (right of decimal) |

An example 64-bit binary encoding of application-layer data is shown in Table 1. The Sy field represents the securities symbol in a binary format. The Si field represents the transaction side. The two bits of this field encode the transaction type, such as buy long (BL) when the transaction is a purchase for holding, buy cover (BC) when the transaction is a purchase to close or cover a previous short sale, sell long (SL) when the transaction is a sale of securities that are currently held, and sell short (SS) which creates an obligation to sell (cover) the security at a future time. The Qt field represents the quantity of the transaction as a count of units represented in binary. These units may be either individual securities or lots of two or more. The Px.P field indicates whether the transaction is for a negative or positive number of units. Certain types of asset classes (e.g., futures) in certain exchanges may be specified by convention with a negative price. Thus, this field may represent an arithmetic sign, plus or minus. The Px.L field indicates the portion of the price of the security that is to the left of the decimal point, and the Px.R field indicates the portion of this price that is to the right of the decimal point.

In alternative embodiments, different numbers of bits may be used to encode these fields. For example, 7 bits could be used to encode the Px.R so that two digits to the right of the decimal can be represented. In some embodiments, one or more brokers may be identified in the binary representation.

As a concrete instance, a transaction involving the long purchase of 100 units of the security ABC Corp., which has a price of $32.40 per unit may be encoded as follows. The Sy field may encode the ticker symbol of ABC Corp. or some other representation thereof (e.g., a unique numerical representation). Since there are 17 bits in the Sy field, $2^{17}$=131,072 different securities can be referenced in this fashion. The Side field may take on a value of 00. The Qt field may encode the value of 100 in binary. The Px.P field may have a value of 1 indicating a positive number of units. The Px.L field may encode 32 in binary and the Px.R field may encode 4 as binary.

Notably, the embodiment and example shown above is just one possibility. Other encoding arrangements may exist. For instance, different trading exchanges and different asset classes could have different encodings within the bits of the application-layer data.

In an alternative embodiment, the proposed transaction could be encoded in one or more custom VLAN tags. Such an encoding may be based on or conform to the embodiments described in U.S. Pat. No. 10,880,211, issued Dec. 29, 2020, and hereby incorporated by reference in its entirety. The latter approach would result in the proposed transaction being provided to application validation module 414 during Ethernet header reception.

Regardless, application validation module 414 may perform validations based on the content of these fields as soon as these bits are received. Not unlike MAC validation module 408, IP validation module 410, and TCP/UDP validation module 412, the validations performed may be based on filters defined in validation filter memory 416. These filters may whitelist (allow) or blacklist (deny) various combinations Ethernet header, IP header, TCP/UDP header, and/or application-layer fields.

Possible validations may include ensuring that each field has a valid value when viewed in isolation, as well as that various combinations of fields have valid values when viewed in aggregate. For example, application validation module 414 may ensure that the Sy field specifies a known symbol, and/or that the combination of Sy and Qt fields do not specify a proposed transaction that exceeds certain predetermined quantity limits for the security specified by the symbol. Various formats of fields and orderings of fields may be supported. For example, three or four different types of messages may be supported, each with a different set of fields and ordering of fields. Application validation module 414 may discard any data packet that does not confirm to one of these types.

Further, the source IP address from the IP header may be used to identify the entity (e.g., client device) originating the proposed transaction, and further limits may be applied on an entity-by-entity basis. Moreover, application validation module 414 may track various connection states, such as TCP sequence and/or acknowledgement numbers. If the sequence or acknowledgement number is incorrect for a given TCP connection, this could also cause application validation module 414 to discard a data packet. If more than a threshold number of improper packets from a particular client device are received within a threshold amount of time (e.g., 10 in one second), application validation module 414 may terminate the TCP connection with the client device and/or otherwise block further communication with the client device. Other filtering possibilities exist.

As noted above, information related to discarded data packets may be written to log memory 418. A rejection or error message may be transmitted to the sending client device (not shown in FIG. 4).

After application validation module 414 completes its operations on the bits of a data packet, the data packet may be passed to MAC processing 420. This module determines the source and destination Ethernet addresses (and ethertype) for an Ethernet header, and then encapsulates the data packet in this new Ethernet header. The source Ethernet address may be that of gateway FPGA 400, and the destination Ethernet address may be that of router 202, for example. The resulting Ethernet frame is provided to network interface 406, which is configured to carry out transmission of the frame by way of network 402. In some cases, the same network interface may be used for both receiving and transmitting Ethernet frames.

In some embodiments, once an Ethernet trailer of a frame is received, its frame check sequence (FCS) may be calculated for the frame (not shown). If the FCS fails, then the data packet is discarded prior to forwarding, even if all other validation checks passed.

The rear of gateway FPGA 400 contains an interface to PCIe bus 422, which may connect to a host system. Gateway FPGA 400 may obtain power from PCIe bus 422, and use signaling capabilities of PCIe bus 422 to manage redundancy and failure procedures. Gateway FPGA 400 may also receive firmware updates by way of PCIe bus 422.

B. Router FPGA

Figure 5:
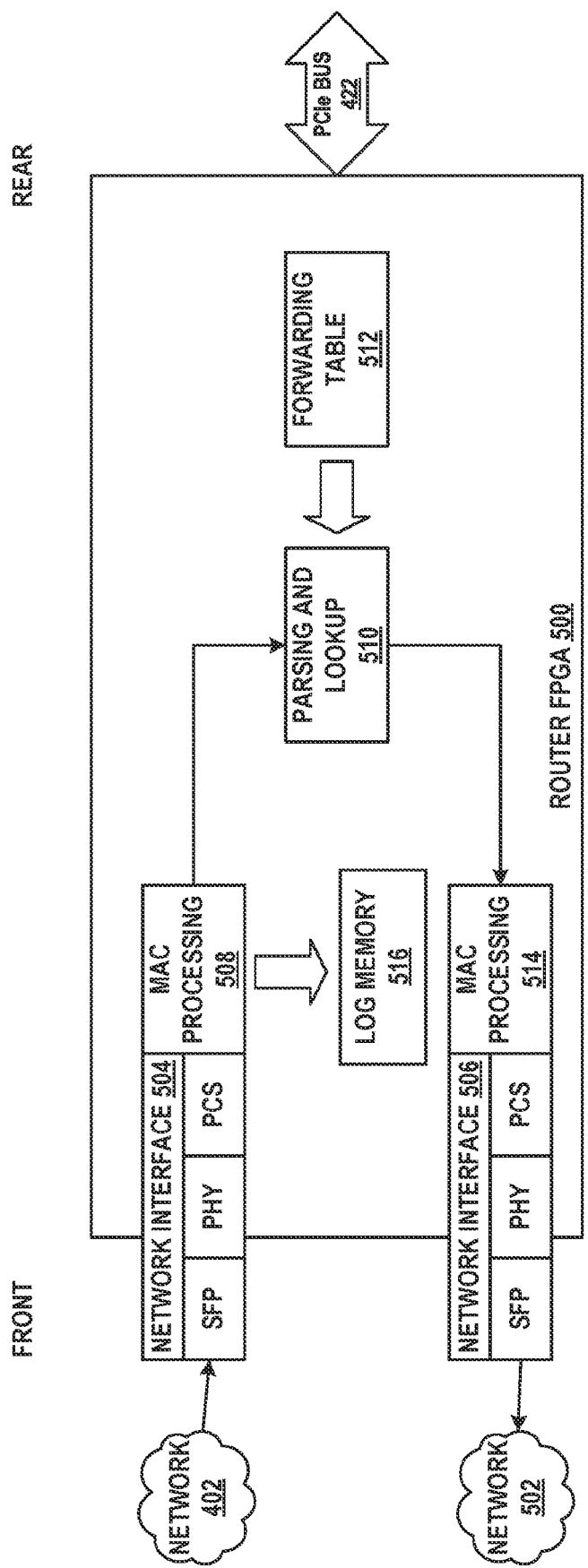
FIG. 5 depicts an example FPGA-based router component, in accordance with example embodiments.

FIG. 5 depicts an example router FPGA 500, configured to perform operations of router 202. Router FPGA 500 is shown containing network interfaces, protocol validation logic, memory, lookup logic, and protocol processing logic. As discussed, however, router FPGA 500 may contain additional components. Further, FIG. 5 depicts a logical schematic and may not be drawn to scale.

The front of router FPGA 500 contains two network interfaces, network interface 504 and network interface 506. Each may include one or more physical ports (e.g., gigabit Ethernet, 10 gigabit Ethernet, or 25 gigabit Ethernet, among others), though only one port for each is shown. Network interface 504 connects to network 402 and from it receives incoming data packets in the form of Ethernet frames. These data packets may have been transmitted by gateway FPGA 400. Network interface 506 connects to network 502 and on it transmits incoming data packets in the form of Ethernet frames to a matching engine or another exchange component. Thus, network 402 and network 502 both may be internal to exchange 106. In some embodiments, just one network interface may be present.

Each of network interface 504 and network interface 506 may include a small form-factor pluggable (SFP) transceiver module, a physical layer (PHY) module, and a physical coding sublayer (PCS) module. In some embodiments, an SFP+, SFP28, QSFP+, or QSFP28 transceiver could be used in place of the SFP transceiver module.

Data packets incoming to exchange 106 may traverse router FPGA 500 in accordance with the arrows of FIG. 5. Thus, MAC processing module 508 may act on the Ethernet headers of these data packets. Particularly, MAC processing module 508 may perform a simple validity check of the these headers (e.g., that the destination address is one that is assigned to router FPGA 500, that the source address is not clearly improper (e.g., a source address of ff:ff:ff:ff:ff:ff), and that the ethertype is known. A data packet that fails these simple validity checks may be discarded. For data packets that pass the simple validity checks, the values of certain Ethernet header fields may be maintained in metadata that accompanies the data packet as it traverses other modules of router FPGA 500.

As discussed above, MAC processing module 508 may validate portions of the data packets in a cut-through or pipelined fashion. For example, processing of the first 176 bits of an Ethernet frame and reception of subsequent bits of the Ethernet frame may occur in parallel.

When a data packet is discarded, information related to the data packet (e.g., at least some of its header values) may be written to log memory 516. This unit of memory may also be DRAM, for example. Periodically or from time to time, log memory 516 may be rotated or flushed, and/or may operate in a first-in-first-out fashion where the oldest log entry is overwritten by the newest entry when log memory 516 is full. Further, a rejection or error message may be transmitted to the sending client device (not shown in FIG. 5).

Parsing and lookup module 510 may receive the data packet from MAC processing 508 and parse the fields of the IP, TCP, and/or UDP headers, as well and the application-layer data, in order to identify the values of certain key fields. These values can be used to determine where to route the data packet. For example, parsing and lookup module 510 may be configured to identify the source IP address and the name of the security in each data packet, and then look up this tuple of values in forwarding table 512.

Forwarding table 512 may include entries mapping the values of one or more key fields to a destination Ethernet address. When the key fields of a data packet match the values in such an entry, the data packet is routed to the specified destination Ethernet address.

TABLE 2

| Source IP address | Security | Destination Ethernet address |
| --- | --- | --- |
| 10.12.171.205 | 5565 | 40:74:e0:28:2c:d3 |
| 10.12.171.205 | 1704 | 40:74:e0:aa:f2:45 |
| 10.12.171.206 | 5565 | 40:74:e0:28:2c:d3 |
| 10.12.171.206 | 498 | 40:74:e0:5e:22:ea |
| default | | 40:74:e0:28:2c:d3 |

Table 2 provides an example of forwarding table 512. In it, a first entry indicates that data packets with a source IP address of 10.12.171.205 and a proposed transaction involving a security numbered 5565 (a reference that maps to the security's symbol) should be routed to destination Ethernet address 40:74:e0:28:2c:d3. Likewise, a second entry indicates that data packets with a source IP address of 10.12.171.205 and a proposed transaction involving a security numbered 1704 should be routed to destination Ethernet address 40:74:e0:aa:f2:45. A third entry indicates that data packets with a source IP address of 10.12.171.206 and a proposed transaction involving a security numbered 5565 should be routed to destination Ethernet address 40:74:e0: 28:2c:d3. A fourth entry indicates that data packets with a source IP address of 10.12.171.206 and a proposed transaction involving a security numbered 498 should be routed to destination Ethernet address 40:74:e0:5e:22:ea. A fifth entry is a default entry, indicating that any data packet with values of key fields not matching any entry in the forwarding table should be routed to destination Ethernet address 40:74:e0: 28:2c:d3 In some cases, a default entry might not be present and data packets not matching any entry are discarded.

As will be described below, this forwarding table structure allows various matching engines to be configured to support slices with arbitrary combinations of originating client devices and securities. Nonetheless, other key fields could be used. Thus, forwarding table 512 could be more or less complicated than what is shown in Table 2. In some embodiments, routing can be based on only the symbol, and therefore forwarding table 512 would not include the source IP address field. In other embodiments, the address looked up could be based on a hash of the security number and destination Ethernet address so that binary lookups are avoided. Other possibilities exist.

In an alternative embodiment, the proposed transaction could be encoded in one or more custom VLAN tags. Such an encoding may be based on or conform to the embodiments described in U.S. Pat. No. 10,880,211, issued Dec. 29, 2020, and hereby incorporated by reference in its entirety. The latter approach would result in the transaction being provided to parsing and lookup module 510 during Ethernet header reception, so a routing decision can be made in parallel to the rest of the Ethernet frame being received. This can result in the routing process completing several dozen nanoseconds earlier than if the proposed transaction is read from the application-layer data.

After parsing and lookup module 510 completes its operations on the bits of a data packet, the data packet may be passed to MAC processing 514. This module determines the source and destination Ethernet addresses (and ethertype) for an Ethernet header, and then encapsulates the data packet in this new Ethernet header. The source Ethernet address may be that of router FPGA 500, and the destination Ethernet address may be provided by the result of looking up the key fields in forwarding table 512. The resulting Ethernet frame is provided to network interface 506, which is configured to carry out transmission of the frame by way of network 502. In some cases, the same network interface may be used for both receiving and transmitting Ethernet frames.

In some embodiments, once an Ethernet trailer of a frame is received, its frame check sequence (FCS) may be calculated for the frame (not shown). If the FCS fails, then the data packet is discarded prior to transmission.

Advantageously, router FPGA 500 may refrain from performing validity checks on IP, TCP, or UDP headers of data packets, as well as validity checks on the application-layer data of data packets. Those checks have already been performed by gateway 200, and thus the processing of router FPGA 500 can be simplified with their omission.

The rear of router FPGA 500 contains an interface to PCIe bus 422, which may connect to a host system. Router FPGA 500 may obtain power from PCIe bus 422, and use signaling capabilities of PCIe bus 422 to manage redundancy and failure procedures. Router FPGA 500 may also receive firmware updates by way of PCIe bus 422, as well as updates to forwarding table 512.

C. Matching Engine FPGA

Figure 6:
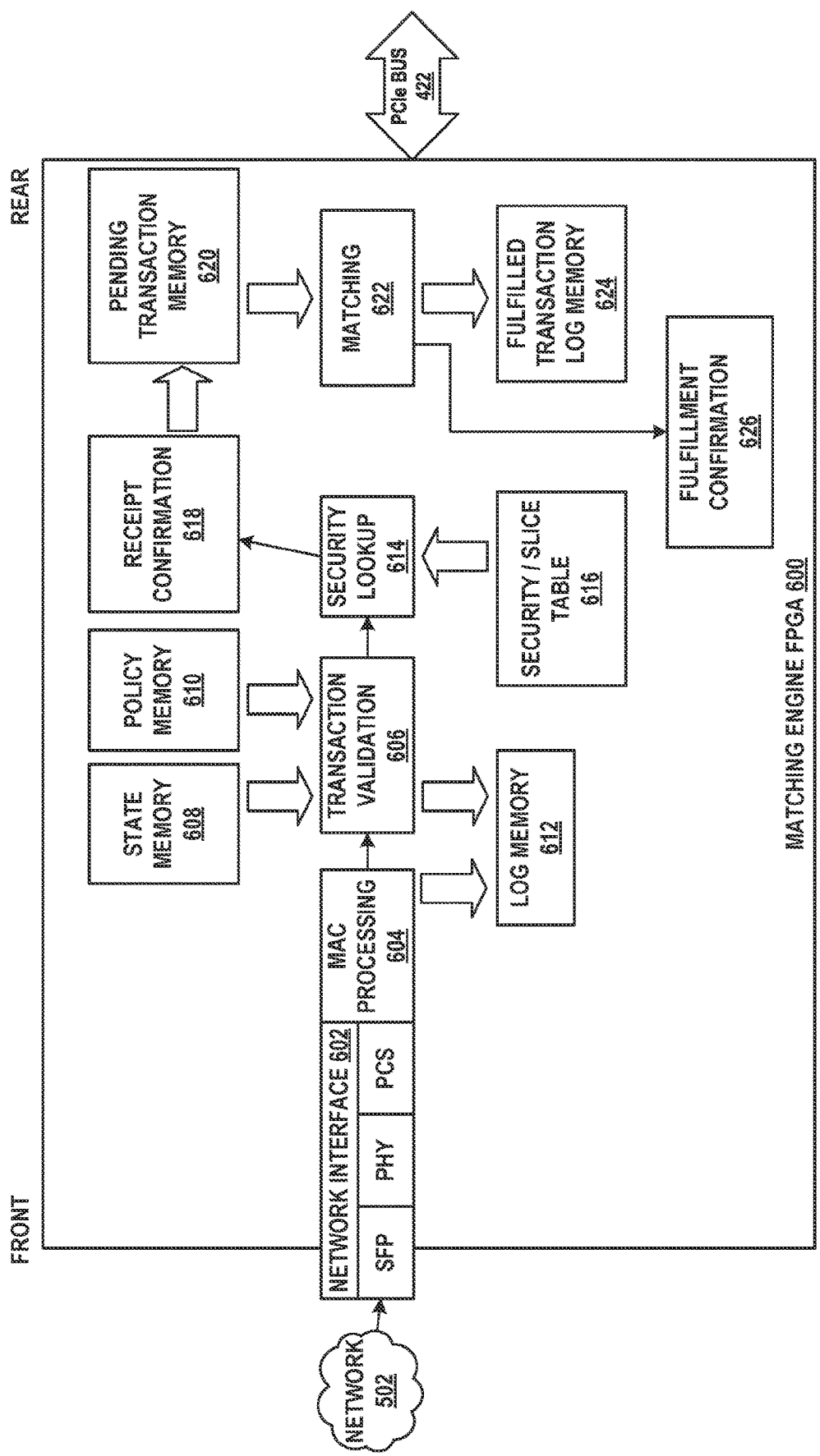
FIG. 6 depicts an example FPGA-based matching engine component, in accordance with example embodiments.

FIG. 6 depicts an example matching engine FPGA 600, configured to perform operations of matching engine 204. Matching engine FPGA 600 is shown containing network interfaces, protocol validation logic, memory, and protocol processing logic. As discussed, however, matching engine FPGA 600 may contain additional components. Further, FIG. 6 depicts a logical schematic and may not be drawn to scale.

The front of matching engine FPGA 600 contains network interface 602. This interface may include one or more physical ports (e.g., gigabit Ethernet, 10 gigabit Ethernet, or 25 gigabit Ethernet), though only one port for each is shown. Network interface 602 connects to network 502 and from it receives incoming data packets in the form of Ethernet frames. These data packets may have been transmitted by router FPGA 500.

Network interface 602 may include a small form-factor pluggable (SFP) transceiver module, a physical layer (PHY) module, and a physical coding sublayer (PCS) module. In some embodiments, an SFP+, SFP28, QSFP+, or QSFP28 transceiver could be used in place of the SFP transceiver module.

Data packets incoming to exchange 106 may traverse matching engine FPGA 600 in accordance with the arrows of FIG. 6. Not unlike MAC processing module 508, MAC processing module 604 may act on the Ethernet headers of these data packets. Particularly, MAC processing module 604 may perform a simple validity check of the these headers (e.g., that the destination address is one that is assigned to matching engine FPGA 600, that the source address is not clearly improper (e.g., a source address of ff:ff:ff:ff:ff:ff), and that the ethertype is known. A data packet that fails these simple validity checks may be discarded. For data packets that pass the simple validity checks, the values of certain Ethernet header fields may be maintained in metadata that accompanies the data packet as it traverses other modules of matching engine FPGA 600.

As discussed above, MAC processing module 604 may validate portions of the data packets in a cut-through or pipelined fashion. For example, processing of the first 176 bits of an Ethernet frame and reception of subsequent bits of the Ethernet frame may occur in parallel.

Unlike gateway FPGA 500, matching engine FPGA 600 may validate proposed transactions encoded in data packets not just based on the information in the data packets themselves but also based on state maintained in state memory 608. This unit of memory may also be DRAM, for example, and may store information from past transactions (including proposed transactions as well as fulfilled transactions). This information may be indexed based on any combination of fields in the data packet. For example, state may be record per source IP address (i.e., per entity), per security, or some combination of both. In some cases, the state may record, for one or more securities, the total monetary value of the proposed and/or fulfilled transactions in which the entity associated with a particular source IP address was involved.

Policy memory 610 contains policies, possibly in the form of rules, that control how and whether transactions are fulfilled. This unit of memory may also be DRAM, for example, and may store a table of such rules. Example rules may indicate that a particular entity or entities can only be involved in transactions with a total per-hour value of no more than $100,000 for a given security and no more than $1,000,000 over all securities. Other example rules may indicate that the particular entity or entities can only be involved in transactions with a total per-day value of no more than $1,000,000 for the given security and no more than $5,000,000 over all securities.

Transaction validation module 606 may receive the data packet from MAC processing 604 and parse the fields of the IP, TCP, and/or UDP headers, as well and the application-layer data, in order to identify the values of certain key fields. These values can be used, possibly in conjunction with information in state memory 608 and policy memory 610. To that point, transaction validation module 606 may be configured to apply one or more policies from policy memory 610. Continuing with the example above, these policies may cause transaction validation module 606 to identify the source IP address and the name of the security in each data packet. These policies may also cause transaction validation module 606 to obtain current running total of fulfilled transaction values associated with these IP addresses and securities from state memory 608. If a proposed transaction would cause the total specified in a policy to be exceeded, transaction validation module 606 may discard the data packet containing this proposed transaction.

To be clear, transaction validation module 606 may include any necessary IP, TCP, and/or UDP protocol processing and validation checks of the associated headers. In some embodiments, Internet Control Message Protocol (ICMP), Internet Group Message Protocol (IGMP), and other protocol processing may be supported as well.

When a data packet is discarded (e.g., by MAC processing module 604, transaction validation module 606, or some other module), information related to the data packet (e.g., at least some of its header values) may be written to log memory 612. This unit of memory may also be DRAM, for example. Periodically or from time to time, log memory 612 may be rotated or flushed, and/or may operate in a first-in-first-out fashion where the oldest log entry is overwritten by the newest entry when log memory 612 is full. Further, a rejection or error message may be transmitted to the sending client device (not shown in FIG. 6).

In an alternative embodiment, the application-layer data containing the proposed transaction may be fed bitwise through these components prior to any FCS validation. In this manner, the proposed transaction is received as quickly as (at line rate) possible by transaction validation module 606. Alternatively, the proposed transaction could be encoded in one or more custom VLAN tags. Such an encoding may be based on or conform to the embodiments described in U.S. Pat. No. 10,880,211, issued Dec. 29, 2020, and hereby incorporated by reference in its entirety. The latter approach would result in the transaction being provided to transaction validation module 606 during Ethernet header reception, so the proposed transaction can be validated in parallel to the rest of the Ethernet frame being received. This can result in the validation completing several dozen nanoseconds earlier than if the proposed transaction is read from the application-layer data.

As noted above, the processing of matching engine 204 may be virtualized into m logically distinct matching engines, referred to as slices. Each of these slices may execute a matching algorithm on a disjoint subset of the incoming proposed transactions. These subsets may be defined by the securities they involve, their source IP address (originating entity), size of the proposed transaction in terms of number of securities or total value thereof, and/or combinations of these or other values. For instance, multiple matching engines, alternatively known as "Pools", each potentially being private ("Private") or public ("Public"), or dark (where newly entered bids or offers are not published via market data distribution mechanisms, hereinafter "Dark Pool") or lit (where newly entered bids or offers are published via market data distribution mechanisms, hereinafter "Lit Pool") may be implemented by way of these slices.

This has the advantage of being able to implement multiple Pools in parallel. As a consequence, proposed transactions that have been pending in one Pool for some period of time can be moved from that Pool to another simply by updating pending transaction memory 620 in 1-2 clock cycles. Previous techniques would have required cancelling and resending the proposed transaction or transmitting a representation of the transaction between physical devices or across networks.

The embodiments shown in FIG. 6 involve one or more slices being supported on the same matching engine card. But, as noted above, exchange 106 may include multiple matching engine cards. So slicing can be implemented across a set of matching engine cards as well as within such cards. To be clear, slices can be implemented on the card level (where each matching engine card is a separate slice), and/or multiple slices can be implemented on one or more of these cards.

TABLE 3

| Security | Slice |
|---|---|
| 5565 | 1 |
| 1704 | 1 |
| 498 | 2 |
| default | 3 |

Regardless, security/slice table 616 contains mappings of securities to slices for matching engine FPGA 600. Table 3 depicts an example of such a table, where the security with the number 5565 is handled by slice 1, the security with the number 1704 is also handled by slice 1, and the security with the number 498 is handled by slice 2. Any other security is handled by slice 3 in accordance with the default rule. As described above, more than just one field in the incoming data packets may be used to identify the slice.

Security lookup module 614 may receive the data packet from transaction validation module 606 and parse the fields the application-layer data, in order to identify the security in the proposed transaction. Security lookup module 614 may then look up the identified security in security/slice table 616. Any error experienced by security lookup module 614 that prevent the slice from being identified may be written to log memory 612 and may result in the proposed transaction being rejected.

Once the slice handling the security is identified, receipt confirmation module 618 may transmit a confirmation message to the originating entity. This message may indicate that the proposed transaction in the data packet has been received but not yet fulfilled. Such a message may use the source IP address of the data packet as its destination IP address, and may be transmitted by way of network interface 602 or another network interface (not shown).

Pending transaction memory 620, stores representations of validated, unmatched proposed transactions. This unit of memory may also be DRAM, for example. These proposed transactions may be stored in various ways. In some embodiments, all proposed transactions may be stored in a single table, where entries of the table specify the proposed transaction (e.g., an identifier of the security, a side, a number of units of the security, a type of order, and a proposed price) as well as an identifier of the slice that is to handle the transaction. In other embodiments, there may be a separate table for each slice, each of these tables containing entries that specify proposed transactions.

Matching module 622 may read the table or tables in pending transaction memory 620 and execute one or more matching algorithms on the information therein. Matching module 622 may be configured to execute separate matching algorithms per slice. These algorithms may be price/time based or pro-rata based for example. When a pair of proposed transactions are matched, the result is a transaction being fulfilled in accordance with the matching algorithm. In some cases, the matching algorithm may be subject to a random delay of 50-300 nanoseconds, for example. This can be used to defeat certain trading strategies that rely on predictive assessment, inference, or reverse inference techniques, among others, to gain unfair insights as to when matches may occur.

When such a transaction fulfillment occurs, information related to the transaction (e.g., an identifier of the security, a number of units of the security, a price, and/or the entities involved) may be written to fulfilled transaction log memory 624. This unit of memory may also be DRAM, for example Periodically or from time to time, entries from fulfilled transaction log memory 624 may transmitted to another component or device for long-term storage.

Also when a transaction is fulfilled, fulfillment confirmation module 626 may transmit fulfillment confirmation messages to the originating entities. These messages may indicate that the respective proposed transactions have been fulfilled. Such a message may be transmitted by way of network interface 602 or another network interface (not shown).

In some embodiments, incoming proposed transactions may be routed directly to matching module 622. Receipt of such a proposed transaction may occur in parallel to processing by other modules of matching engine FPGA 600, and may trigger the execution of a matching algorithm for the proposed transaction and any other proposed transactions stored in pending transaction memory 620. In some cases, the fields of the application-layer data may be ordered so that those that are used to determine the validity of the proposed transaction are placed earlier in the ordering. These may be side, symbol, quality, and price. These fields may be followed by less important fields that are not needed for matching. Thus, as the application-layer data is received, the bits of these fields can be validated and/or provided to matching module 622 while the rest of the proposed transaction is being received or otherwise processed.

The rear of matching engine FPGA 600 contains an interface to PCIe bus 422, which may connect to a host system. Matching engine FPGA 600 may obtain power from PCIe bus 422, and use signaling capabilities of PCIe bus 422 to manage redundancy and failure procedures. Matching engine FPGA 600 may also receive firmware updates by way of PCIe bus 422. In some embodiments, copies of proposed transactions and/or fulfilled transactions may be provided to external components by way of PCIe bus 422. These external components may carry out any back-office processing and other operational aspects of exchange 106 on this data. For example, a copy of the received Ethernet frame may be transmitted from MAC processing module 604 to PCIe bus 422 (not shown).

V. Technical Advantages

The embodiments herein exhibit numerous technical advantages over conventional exchange designs. Notably, these embodiments can be arranged to operate at line speed, up to 10 gigabits per second or more. Thus, they are high-capacity. They are also low-latency, as the path for incoming data packets is designed so that these data packets are processed as they arrive, perhaps some of this processing occurring before the entire packet is received.

Further, these embodiments are more secure than traditional techniques. Finding network security exploits in custom hardware is more difficult than doing so in widely-deployed software-based network protocol stacks. Further, exploits that rely on making changes to code on the attacked device (e.g., by way of buffer overflow or overwriting of a program segment or memory) are virtually impossible to execute on custom hardware.

Moreover, the use of gateways at the perimeter of the exchange to filter out all data packets except those that are demonstrably from a known source and contain a valid transaction is beneficial. This architecture prevents many types of distributed denial of service (DDOS) attacks because the filtering can occur at line speed. This protects the interior of the exchange (e.g., the router(s) and the matching engine(s)) from inappropriate activity, whether that activity was intended or not intended. Further, in the unlikely situation that a gateway is overwhelmed by incoming data packets, the gateway will fail, causing the path to the interior of the exchange to also fail. Thus, the interior of the exchange remains protected. Nonetheless, the gateway, router, and matching engine components described herein could be implemented together on the same card or distributed across two cards rather than three cards.

One way in which line speed performance can be maintained is by operating the network interface transceivers (i.e., the SFP and/or PHY modules) at double their specified rate. Thus, a 10 gigabit per second transceiver is overclocked to 20 gigabits per second. This can serve to accommodate bursts of incoming data packets.

Further, the PCS module (or MAC processing module) clock counter can be used to generate timestamps when an incoming packet arrives to any of the exchange components (i.e., gateway, router, and/or matching engine), and then tag these incoming packets with their timestamps. The timestamps may follow the data packets through the path of each component as metadata, and/or be logged to memory.

Generating timestamps in this fashion allows for very accurate timestamping of proposed transactions. For instance, if a 10 gigabit network interface is operating a 322.26 MHz, each clock cycle is 3.1 nanoseconds. This is much more accurate than using the Precision Time Protocol (PTP), which can be subject to significant jitter. Such timestamps can then be used to provide highly-accurate timing measurements for each step of exchange processing, for example, as well as to be used in price/time matching algorithms.

A further set of advantages has to do with capacity management. When multiple matching engine cards are used, there may be a number of securities assigned to each card. If any particular security or set of securities is undergoing an unusually large volume of trading, this could result in the load across matching engine cards becoming unbalanced. When this happens a security from a more heavily-loaded card can be moved to a less heavily-loaded card. For example, transactions involving the security could be paused on its current card. Then, the order queue and/or set of proposed transactions involving the security may be transmitted from the current card to a newly-assigned card that is less populated. One or more routers may be updated to reflect this change (i.e., their routing tables are amended to direct transactions involving the security to the newly-assigned card). Then trading of the security resumes on the newly-assigned card.

Additionally, the hardware components defined herein can be used to facilitate the matching of any type of transactions, not just the security trading examples provided herein. For example, this architecture could facilitate machine-to-machine arbitrage of computing resources, where proposed transactions indicate an extent of processing, memory, and/or network resources available or offered. Other examples exist.

VI. Example Operations

Figure 7:
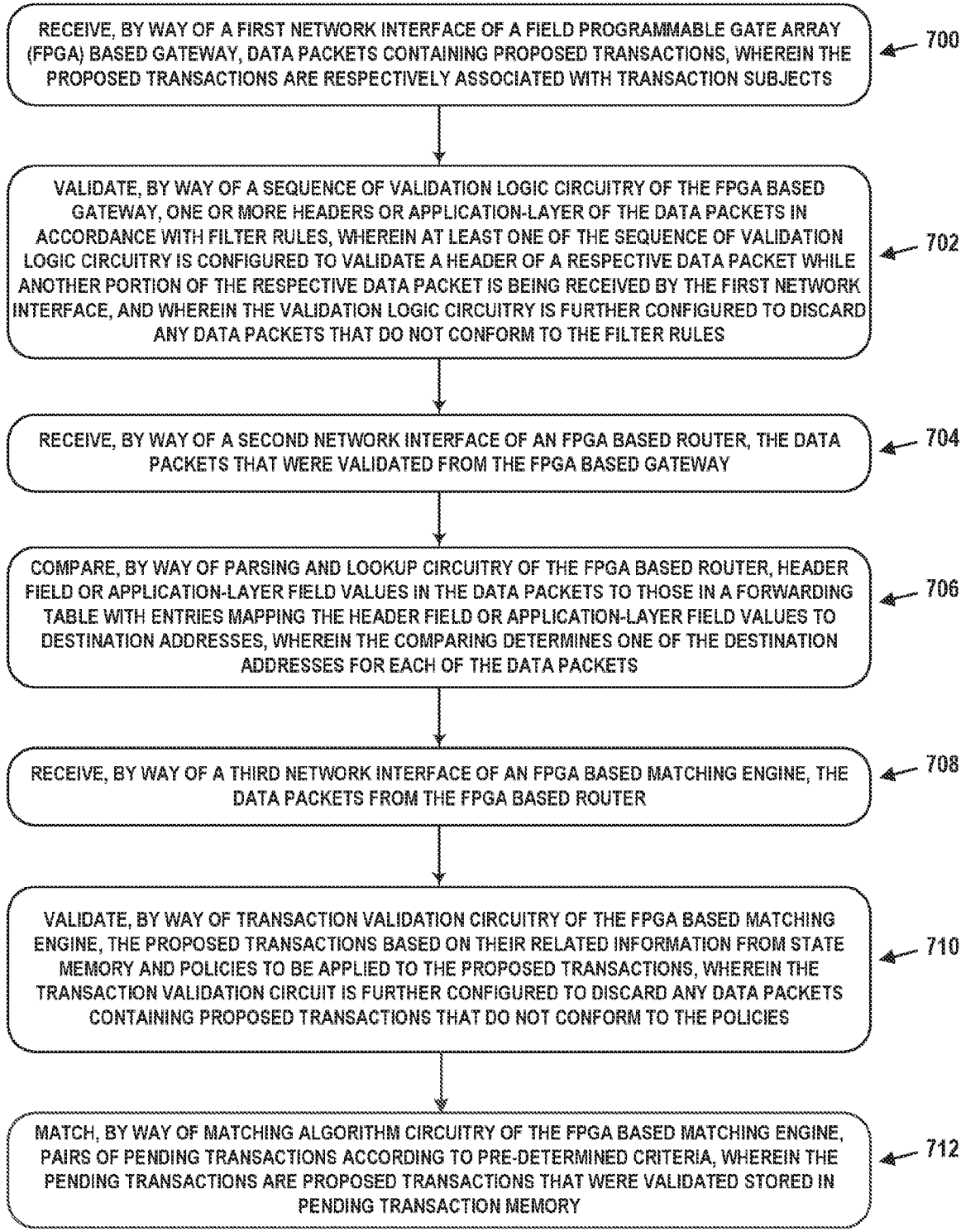
FIG. 7 is a flow chart, in accordance with example embodiments.

FIG. 7 is a flow chart illustrating an example embodiment. The process illustrated by FIG. 7 may be carried out by the exchange components described herein. However, the process can be carried out by other types of devices or device subsystems. The embodiments of FIG. 7 may be simplified by the removal of any one or more of the features shown therein. Further, these embodiments may be combined with features, aspects, and/or implementations of any of the previous figures or otherwise described herein.

Block 700 may involve receiving, by way of a first network interface of an FPGA based gateway, data packets containing proposed transactions, wherein the proposed transactions are respectively associated with transaction subjects. The transaction subjects may be securities or other items of value and/or resources.

Block 702 may involve validating, by way of a sequence of validation logic circuitry of the FPGA based gateway, one or more headers or application-layer of the data packets in accordance with filter rules, wherein at least one of the sequence of validation logic circuitry is configured to validate a header of a respective data packet while another portion of the respective data packet is being received by the first network interface, and wherein the validation logic circuitry is further configured to discard any data packets that do not conform to the filter rules.

Block 704 may involve receiving, by way of a second network interface of an FPGA based router, the data packets that were validated from the FPGA based gateway.

Block 706 may involve comparing, by way of parsing and lookup circuitry of the FPGA based router, header field or application-layer field values in the data packets to those in a forwarding table with entries mapping the header field or application-layer field values to destination addresses, wherein the comparing determines one of the destination addresses for each of the data packets. The destination addresses may be medium access control (MAC) addresses, such as Ethernet addresses for example.

Block 708 may involve receiving, by way of a third network interface of an FPGA based matching engine, the data packets from the FPGA based router.

Block 710 may involve validating, by way of transaction validation circuitry of the FPGA based matching engine, the proposed transactions based on their related information from state memory and policies to be applied to the proposed transactions, wherein the transaction validation circuitry is further configured to discard any data packets containing proposed transactions that do not conform to the policies.

Block 712 may involve matching, by way of matching algorithm circuitry of the FPGA based matching engine, pairs of pending transactions according to pre-determined criteria, wherein the pending transactions are proposed transactions that were validated stored in pending transaction memory.

In some embodiments, the sequence of validation logic circuitry is configured to validate Ethernet headers, IP headers, TCP or UDP headers, and the application-layer of the data packets as bits from these headers arrive at the FPGA based gateway.

In some embodiments, the filter rules identify field values of the one or more headers or application-layer of the data packets that are blacklisted, wherein the sequence of validation logic circuitry is configured to discard the data packets that match the field values that are blacklisted.

In some embodiments, the filter rules identify field values of the one or more headers or application-layer of the data packets that are whitelisted, wherein the sequence of validation logic circuitry is configured to discard the data packets that do not match the field values that are whitelisted.

In some embodiments, the FPGA based gateway also includes log memory, wherein the sequence of validation logic circuitry is configured to write information from the data packets that fail validation into the log memory.

In some embodiments, the FPGA based gateway is further configured to replace Ethernet headers of the data packets that were validated with new Ethernet headers containing destination Ethernet addresses specifying the FPGA based router.

In some embodiments, the header field or application-layer field values in the forwarding table indicate the transaction subjects of the data packets, wherein the parsing and lookup circuitry is also configured to compare the transaction subjects to those in the forwarding table.

In some embodiments, the header field or application-layer field values in the forwarding table indicate a combination of a source identifier and the transaction subjects of the data packets, wherein the parsing and lookup circuitry is also configured to compare the combination of the source identifier and transaction subjects to those in the forwarding table.

In some embodiments, the FPGA based router includes a bus connection to a host system, wherein the FPGA based router is also configured to receive updates to the forwarding table by way of the bus connection.

In some embodiments, the FPGA based router is further configured to replace the destination addresses of the data packets that were determined by way of the forwarding table with new destination Ethernet addresses specifying the FPGA based matching engine.

In some embodiments, the state memory contains information related previously fulfilled transactions involving transaction subjects or source identifiers in common with those of at least some of the data packets, wherein the source identifiers specify entities originating the proposed transactions.

In some embodiments, the policies to be applied to the proposed transactions are formulated as rules, wherein the rules specify limits to total amounts of certain transaction subjects that can be fulfilled within a predetermined period of time.

In some embodiments, the policies to be applied to the proposed transactions are formulated as rules, wherein the rules specify limits to total amounts of certain transaction subjects per particular instances of the source identifiers that can be fulfilled within a predetermined period of time.

In some embodiments, the FPGA based matching engine also includes log memory, wherein the transaction validation circuitry is configured to write information from the data packets that fail validation into the log memory.

In some embodiments, parts of the FPGA based matching engine support virtualization into slices, wherein the pending transaction memory stores proposed transactions that were validated with their associated slices, and wherein the matching algorithm circuitry is further configured to only match pairs of pending transactions with a common associated slice.

In some embodiments, the FPGA based matching engine also includes lookup table memory configured with mappings of the transaction subjects to the slices or with combinations of transaction subjects and source identifiers to the slices, wherein the source identifiers specify entities originating the proposed transactions.

In some embodiments, the FPGA based matching engine also includes lookup circuitry configured to retrieve the slices associated with data packets from the lookup table memory and provide the slices retrieved to the pending transaction memory or the matching algorithm circuitry.

In some embodiments, the FPGA based matching engine is also configured to transmit receipt confirmations for the proposed transactions that were validated but have not yet been matched.

In some embodiments, the FPGA based matching engine is also configured to transmit fulfilment confirmations for the proposed transactions that were matched.

Figure 8:
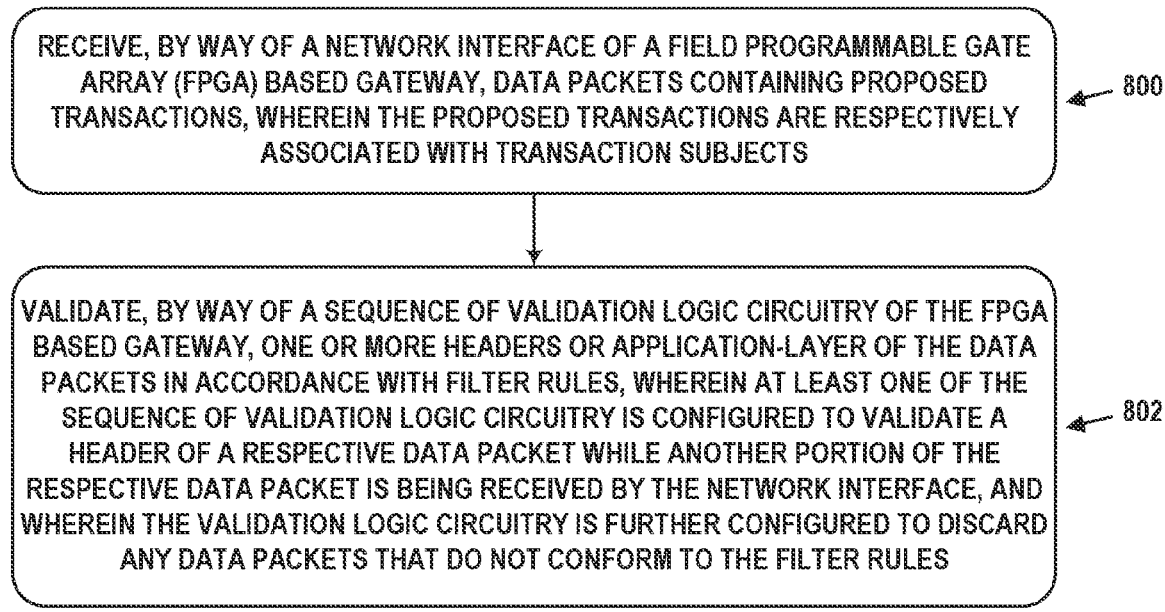
FIG. 8 is a flow chart, in accordance with example embodiments.

FIG. 8 is a flow chart illustrating an example embodiment. The process illustrated by FIG. 8 may be carried out by the exchange components described herein. However, the process can be carried out by other types of devices or device subsystems. The embodiments of FIG. 8 may be simplified by the removal of any one or more of the features shown therein. Further, these embodiments may be combined with features, aspects, and/or implementations of any of the previous figures or otherwise described herein.

Block 800 may involve receiving, by way of a network interface of a field programmable gate array (FPGA) based gateway, data packets containing proposed transactions, wherein the proposed transactions are respectively associated with transaction subjects.

Block 802 may involve validating, by way of a sequence of validation logic circuitry of the FPGA based gateway, one or more headers or application-layer of the data packets in accordance with filter rules, wherein at least one of the sequence of validation logic circuitry is configured to validate a header of a respective data packet while another portion of the respective data packet is being received by the network interface, and wherein the validation logic circuitry is further configured to discard any data packets that do not conform to the filter rules.

In some embodiments, the sequence of validation logic circuitry is configured to validate Ethernet headers, IP headers, TCP or UDP headers, and the application-layer of the data packets as bits from these headers arrive at the FPGA based gateway.

In some embodiments, the filter rules identify field values of the one or more headers or application-layer of the data packets that are blacklisted, wherein the sequence of validation logic circuitry is configured to discard the data packets that match the field values that are blacklisted.

In some embodiments, the filter rules identify field values of the one or more headers or application-layer of the data packets that are whitelisted, wherein the sequence of validation logic circuitry is configured to discard the data packets that do not match the field values that are whitelisted.

In some embodiments, the FPGA based gateway also includes log memory, wherein the sequence of validation logic circuitry is configured to write information from the data packets that fail validation into the log memory.

In some embodiments, the FPGA based gateway is further configured to replace Ethernet headers of the data packets that were validated with new Ethernet headers containing destination Ethernet addresses specifying an FPGA based router and to transmit these data packets to the FPGA based router.

Figure 9:
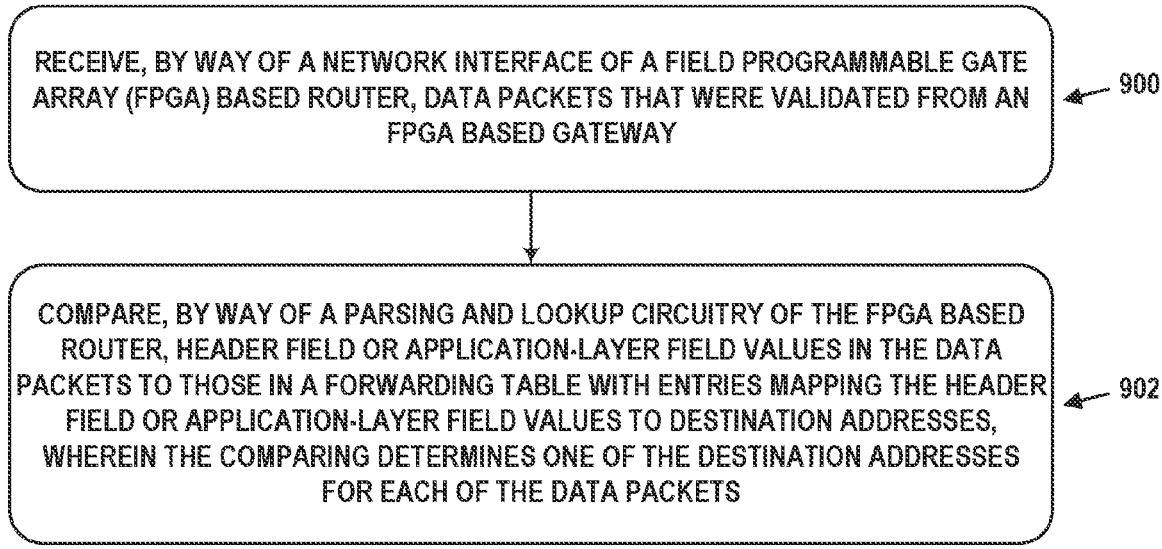
FIG. 9 is a flow chart, in accordance with example embodiments.

FIG. 9 is a flow chart illustrating an example embodiment. The process illustrated by FIG. 9 may be carried out by the exchange components described herein. However, the process can be carried out by other types of devices or device subsystems. The embodiments of FIG. 9 may be simplified by the removal of any one or more of the features shown therein. Further, these embodiments may be combined with features, aspects, and/or implementations of any of the previous figures or otherwise described herein.

Block 900 may involve receiving, by way of a network interface of a field programmable gate array (FPGA) based router, data packets that were validated by an FPGA based gateway.

Block 902 may involve comparing, by way of a parsing and lookup circuitry of the FPGA based router, header field or application-layer field values in the data packets to those in a forwarding table with entries mapping the header field or application-layer field values to destination addresses, wherein the comparing determines one of the destination addresses for each of the data packets.

In some embodiments, the header field or application-layer field values in the forwarding table indicate the transaction subjects of the data packets, wherein the parsing and lookup circuitry is also configured to compare the transaction subjects to those in the forwarding table.

In some embodiments, the header field or application-layer field values in the forwarding table indicate a combination of a source identifier and the transaction subjects of the data packets, wherein the parsing and lookup circuitry is also configured to compare the combination of the source identifier and transaction subjects to those in the forwarding table.

In some embodiments, the FPGA based router includes a bus connection to a host system, wherein the FPGA based router is also configured to receive updates to the forwarding table by way of the bus connection.

In some embodiments, the FPGA based router is further configured to replace the destination addresses of the data packets that were determined by way of the forwarding table with new destination Ethernet addresses specifying an FPGA based matching engine and to and to transmit these data packets to the FPGA based matching engine.

Figure 10:
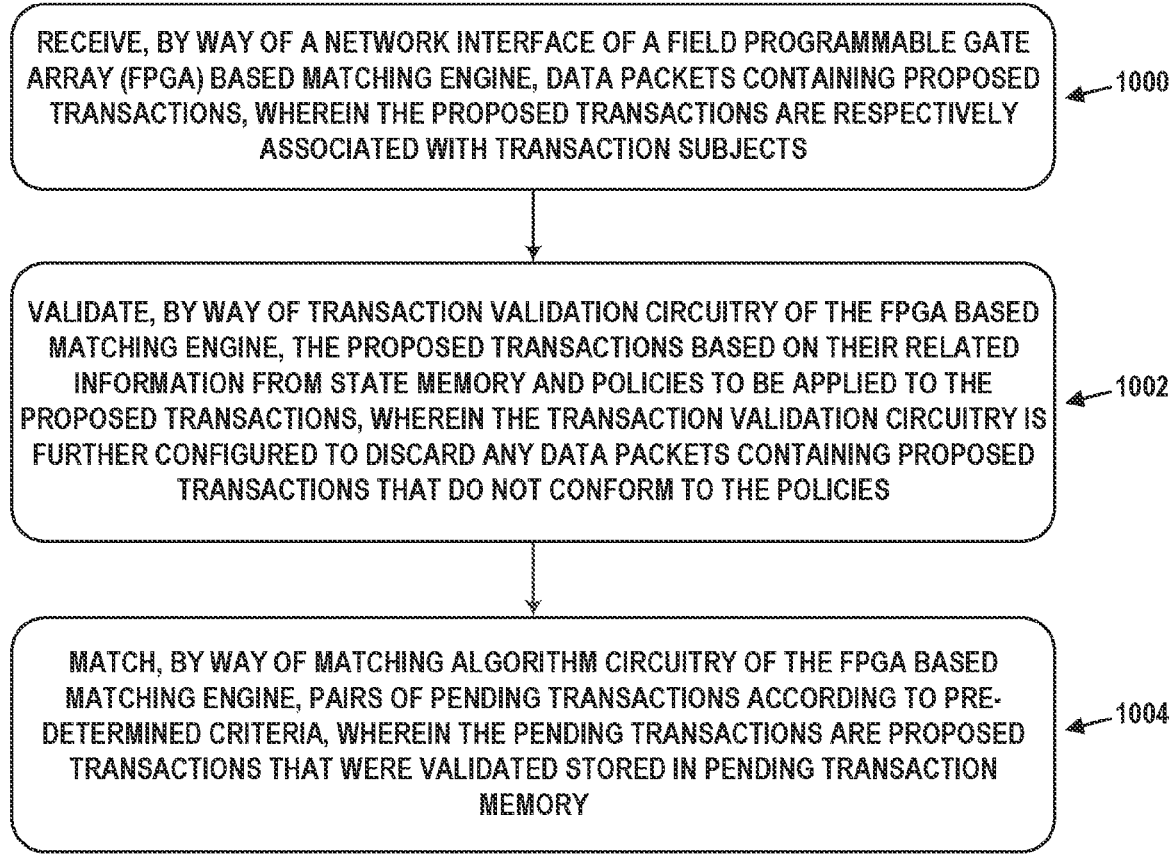
FIG. 10 is a flow chart, in accordance with example embodiments.

FIG. 10 is a flow chart illustrating an example embodiment. The process illustrated by FIG. 10 may be carried out by the exchange components described herein. However, the process can be carried out by other types of devices or device subsystems. The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving, by way of a network interface of a field programmable gate array (FPGA) based matching engine, data packets containing proposed transactions, wherein the proposed transactions are respectively associated with transaction subjects.

Block 1002 may involve validating, by way of transaction validation circuitry of the FPGA based matching engine, the proposed transactions based on their related information from state memory and policies to be applied to the proposed transactions, wherein the transaction validation circuitry is further configured to discard any data packets containing proposed transactions that do not conform to the policies.

Block 1004 may involve matching, by way of matching algorithm circuitry of the FPGA based matching engine, pairs of pending transactions according to pre-determined criteria, wherein the pending transactions are proposed transactions that were validated stored in pending transaction memory.

In some embodiments, the state memory contains information related to previously fulfilled transactions involving transaction subjects or source identifiers in common with those of at least some of the data packets, wherein the source identifiers specify entities originating the proposed transactions.

In some embodiments, the policies to be applied to the proposed transactions are formulated as rules, wherein the rules specify limits to total amounts of certain transaction subjects that can be fulfilled within a predetermined period of time.

In some embodiments, the policies to be applied to the proposed transactions are formulated as rules, wherein the rules specify limits to total amounts of certain transaction subjects per particular instances of the source identifiers that can be fulfilled within a predetermined period of time.

In some embodiments, the FPGA based matching engine also contains log memory, wherein the transaction validation circuitry is configured to write information from the data packets that fail validation into the log memory.

In some embodiments, parts of the FPGA based matching engine support virtualization into slices, wherein the pending transaction memory stores proposed transactions that were validated with their associated slices, wherein the matching algorithm circuitry is further configured to only match pairs of pending transactions with a common associated slice.

In some embodiments, the FPGA based matching engine also contains lookup table memory configured with mappings of the transaction subjects to the slices or with combinations of transaction subjects and source identifiers to the slices, wherein the source identifiers specify entities originating the proposed transactions.

In some embodiments, the FPGA based matching engine also contains lookup circuitry configured to retrieve the slices associated with data packets from the lookup table memory and provide the slices retrieved to the pending transaction memory or the matching algorithm circuitry.

In some embodiments, the FPGA based matching engine is also configured to transmit receipt confirmations for the proposed transactions that were validated but have not yet been matched.

In some embodiments, the FPGA based matching engine is also configured to transmit fulfilment confirmations for the proposed transactions that were matched.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A field programmable gate array (FPGA) based matching engine comprising:
a network interface configured to receive data packets containing proposed transactions, wherein the proposed transactions are respectively associated with transaction subjects, and wherein the network interface identifies network addresses in initial sequences of bits in each of the data packets in parallel to receiving respective further sequences of bits in each of the data packets;
state memory containing information related to the proposed transactions;
policy memory containing policies to be applied to the proposed transactions;
transaction validation circuitry configured to: receive the proposed transactions from the network interface and validate the proposed transactions based on their identified network addresses, their related information from the state memory, and the policies, wherein the transaction validation circuitry is further configured to discard any data packets containing proposed transactions that do not conform to the policies;

pending transaction memory configured to store proposed transactions that were validated in one or more tables; and matching algorithm circuitry configured to read at least some of the proposed transactions from the one more of tables and match pairs of pending transactions according to pre-determined criteria, wherein the matching algorithm circuitry is subject to a 50-300 nanosecond random delay when matching the pairs of the pending transactions.

2. The FPGA based matching engine of claim 1, wherein the state memory contains information related to previously fulfilled transactions involving transaction subjects or source identifiers in common with those of at least some of the data packets, and wherein the source identifiers specify entities originating the proposed transactions.

3. The FPGA based matching engine of claim 1, wherein the policies to be applied to the proposed transactions are formulated as rules, and wherein the rules specify limits to total amounts of certain transaction subjects that can be fulfilled within a predetermined period of time.

4. The FPGA based matching engine of claim 1, wherein the policies to be applied to the proposed transactions are formulated as rules, and wherein the rules specify limits to total amounts of certain transaction subjects per particular instances of source identifiers that can be fulfilled within a predetermined period of time.

5. The FPGA based matching engine of claim 1, further comprising:

log memory, wherein the transaction validation circuitry is configured to write information from the data packets that fail validation into the log memory.

6. The FPGA based matching engine of claim 1, wherein parts of the FPGA based matching engine support virtualization into slices, wherein the pending transaction memory stores proposed transactions that were validated with their associated slices, and wherein the matching algorithm circuitry is further configured to only match pairs of pending transactions with a common associated slice.

7. The FPGA based matching engine of claim 6, further comprising:

lookup table memory configured with mappings of the transaction subjects to the slices or with combinations of transaction subjects and source identifiers to the slices, wherein source identifiers specify entities originating the proposed transactions.

8. The FPGA based matching engine of claim 7, further comprising:

lookup circuitry configured to retrieve indications of the slices associated with data packets from the lookup table memory and provide the indications of the slices retrieved to the pending transaction memory or the matching algorithm circuitry.

9. The FPGA based matching engine of claim 1, wherein the FPGA based matching engine is also configured to transmit receipt confirmations for the proposed transactions that were validated but have not yet been matched.

10. The FPGA based matching engine of claim 1, wherein the FPGA based matching engine is also configured to transmit fulfilment confirmations for the proposed transactions that were matched.

11. A method comprising:

receiving, by way of a network interface of a field programmable gate array (FPGA) based matching engine, data packets containing proposed transactions, wherein the proposed transactions are respectively associated with transaction subjects, and wherein the network interface identifies network addresses in initial sequences of bits in each of the data packets in parallel to receiving respective further sequences of bits in each of the data packets;

receiving, by way of transaction validation circuitry of the FPGA based matching engine, the proposed transactions from the network interface;

validating, by way of the transaction validation circuitry, the proposed transactions based on their identified network addresses, their related information from state memory, and policies to be applied to the proposed transactions, wherein the transaction validation circuitry is further configured to discard any data packets containing proposed transactions that do not conform to the policies; and matching, by way of matching algorithm circuitry of the FPGA based matching engine, pairs of pending transactions according to pre-determined criteria, wherein the pending transactions are proposed transactions that were validated and stored in one or more tables of pending transaction memory, wherein the matching algorithm circuitry is subject to a 50-300 nanosecond random delay when matching the pairs of the pending transactions.

12. The method of claim 11, wherein the state memory contains information related to previously fulfilled transactions involving transaction subjects or source identifiers in common with those of at least some of the data packets, and wherein the source identifiers specify entities originating the proposed transactions.

13. The method of claim 11, wherein the policies to be applied to the proposed transactions are formulated as rules, and wherein the rules specify limits to total amounts of certain transaction subjects that can be fulfilled within a predetermined period of time.

14. The method of claim 11, wherein the policies to be applied to the proposed transactions are formulated as rules, and wherein the rules specify limits to total amounts of certain transaction subjects per particular instances of source identifiers that can be fulfilled within a predetermined period of time.

15. The method of claim 11, wherein the FPGA based matching engine also contains log memory, and wherein the transaction validation circuitry is configured to write information from the data packets that fail validation into the log memory.

16. The method of claim 11, wherein parts of the FPGA based matching engine support virtualization into slices, wherein the pending transaction memory stores proposed transactions that were validated with their associated slices, and wherein the matching algorithm circuitry is further configured to only match pairs of pending transactions with a common associated slice.

17. The method of claim 16, wherein the FPGA based matching engine also contains lookup table memory configured with mappings of the transaction subjects to the slices or with combinations of transaction subjects and source identifiers to the slices, wherein source identifiers specify entities originating the proposed transactions.

18. The method of claim 17, wherein the FPGA based matching engine also contains lookup circuitry configured to retrieve indications of the slices associated with data packets from the lookup table memory and provide the indications of the slices retrieved to the pending transaction memory or the matching algorithm circuitry.

19. The method of claim 11, wherein the FPGA based matching engine is also configured to transmit receipt confirmations for the proposed transactions that were validated but have not yet been matched.

20. The method of claim 11, wherein the FPGA based matching engine is also configured to transmit fulfilment confirmations for the proposed transactions that were matched.

\* \* \* \* \*